(12) United States Patent
Ikeda

(10) Patent No.: US 7,209,268 B2
(45) Date of Patent: Apr. 24, 2007

(54) LINE ILLUMINATING DEVICE

(75) Inventor: Makoto Ikeda, Osaka (JP)

(73) Assignee: Nippon Sheet Glass Co., Ltd., Osaka (JP)

( * ) Notice: Subject to any disclaimer, the term of this patent is extended or adjusted under 35 U.S.C. 154(b) by 910 days.

(21) Appl. No.: 09/811,149

(22) Filed: Mar. 16, 2001

(65) Prior Publication Data

US 2001/0035986 A1    Nov. 1, 2001

(30) Foreign Application Priority Data

| Mar. 16, 2000 | (JP) | ............................. 2000-073321 |
| Aug. 10, 2000 | (JP) | ............................. 2000-241971 |
| Aug. 23, 2000 | (JP) | ............................. 2000-251795 |

(51) Int. Cl.
*H04N 1/04* (2006.01)

(52) U.S. Cl. ...................... 358/475; 358/509; 358/484; 250/208.1

(58) Field of Classification Search ................ 358/475, 358/484, 509, 482, 474, 514, 513; 250/208.1
See application file for complete search history.

(56) References Cited

U.S. PATENT DOCUMENTS

| 4,239,989 A | | 12/1980 | Brajder |
| 4,257,084 A | | 3/1981 | Reynolds ..................... 358/487 |
| 4,791,540 A | | 12/1988 | Dreyer, Jr. et al. ......... 358/484 |
| 4,827,314 A | | 5/1989 | Fujiwara |
| 5,210,411 A | * | 5/1993 | Oshima et al. ............. 250/271 |
| 5,600,455 A | | 2/1997 | Ishikawa et al. ............ 358/474 |
| 5,655,827 A | | 8/1997 | Kaneko et al. ............. 382/167 |
| 5,835,195 A | | 11/1998 | Gibson et al. |
| 5,914,760 A | * | 6/1999 | Daiku .......................... 349/65 |
| 6,133,565 A | * | 10/2000 | Fujimoto et al. ............ 250/234 |
| 6,172,745 B1 | * | 1/2001 | Voser et al. .................. 356/71 |
| 6,198,551 B1 | * | 3/2001 | Tabata ........................ 358/514 |
| 6,206,535 B1 | * | 3/2001 | Hattori et al. ................ 362/31 |
| 6,295,141 B1 | * | 9/2001 | Ogura et al. ................ 358/475 |
| 6,305,811 B1 | | 10/2001 | Beeson et al. ............. 382/176 |
| 6,333,777 B1 | | 12/2001 | Sato |
| 6,333,779 B1 | | 12/2001 | Tabata et al. |
| 6,346,997 B1 | * | 2/2002 | Takeda et al. .............. 358/484 |

(Continued)

FOREIGN PATENT DOCUMENTS

JP    08163320    6/1996    ................. 358/474

(Continued)

*Primary Examiner*—Douglas Q. Tran
*Assistant Examiner*—Negussie Worku
(74) *Attorney, Agent, or Firm*—Merchant & Gould P.C.

(57) ABSTRACT

Two illuminating units 2L and 2R, each having a light guide provided at its one end, with a light-emitting source, are provided. Each illuminating unit is arranged in such a manner that light emitted from its emission plane irradiates the same area of a document-reading plane and the light-emitting source is situated on the opposite side in a main-scanning direction (i.e. the longitudinal direction). By alternately arranging two illuminating units, it is possible to offset characteristics of each illuminating unit so that uniformity and equalization of light intensity distribution can be improved. Since each-illuminating unit is arranged so that its emission plane is symmetric relative to a plane at right angles to the document-reading surface, it is possible to reduce shading that is produced on a document surface when the document surface is not flat.

10 Claims, 28 Drawing Sheets

U.S. PATENT DOCUMENTS 6,456,748 B1 * 9/2002 Yushiya et al. ............. 382/312
6,556,317 B2 * 4/2003 Tabata et al. ............... 358/509
6,771,401 B2 * 8/2004 Chen .......................... 358/512
6,808,280 B2 * 10/2004 Uemura et al. ............... 362/31

FOREIGN PATENT DOCUMENTS

JP          10126581      5/1998      ............. 358/487

* cited by examiner

FIG. 3 (a) Illuminating unit provided with a light-emitting source on the origin side of main-scanning coordinates
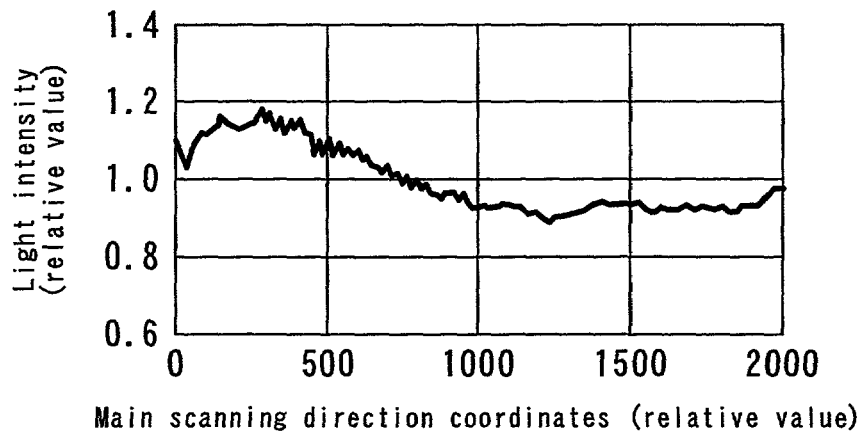
FIG. 3 (b) Illuminating unit provided with a light-emitting source on the 2000 side of main-scanning coordinates
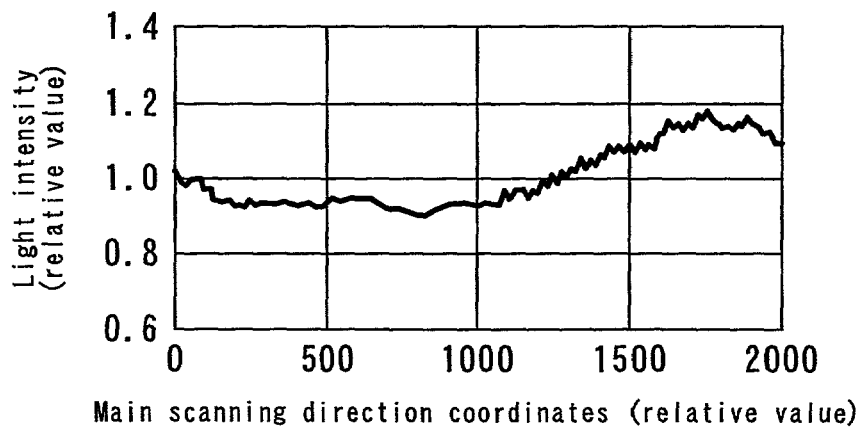
FIG. 3 (c) Line illuminating device of the present invention (Compound of each illuminating unit)
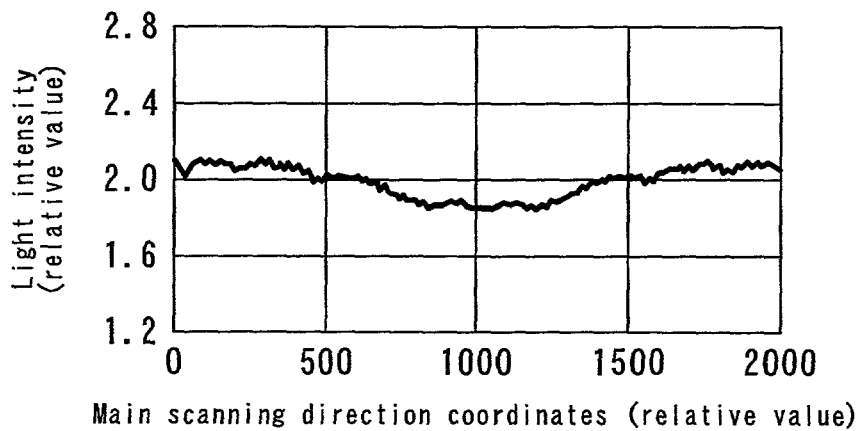

FIG. 4 (a) Light spatial intensity distribution of the left illuminating unit in the sub-scanning direction
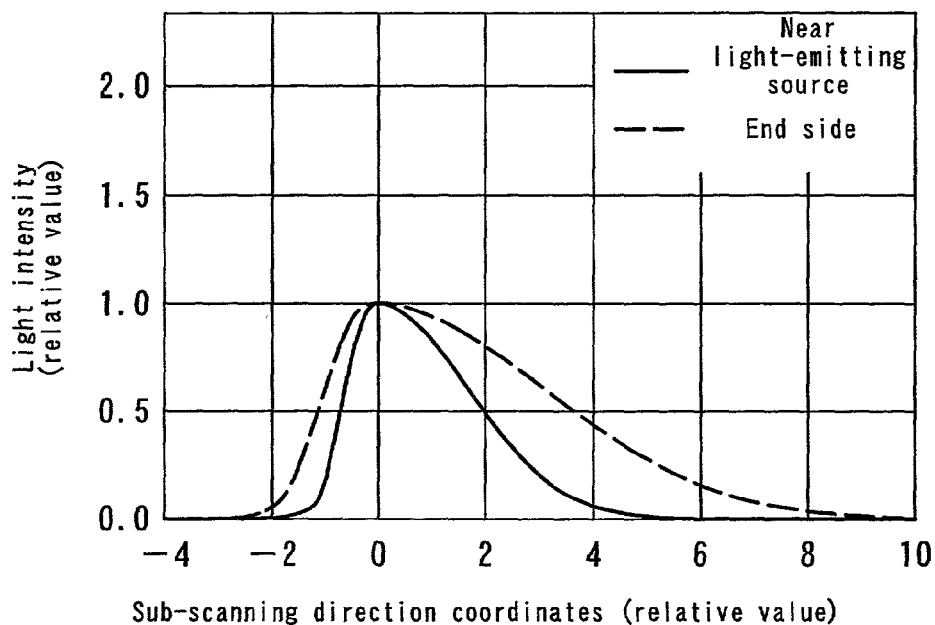
FIG. 4 (b) Light spatial intensity distribution of line illuminating device of the present invention in the sub-scanning direction
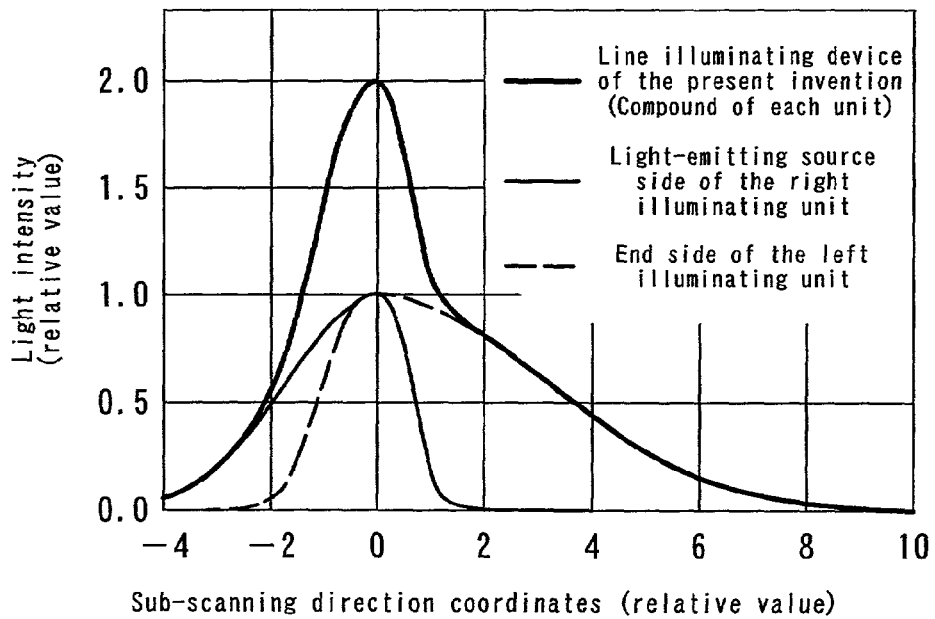

FIG. 12 (a)   Arrangement of light scattering patterns
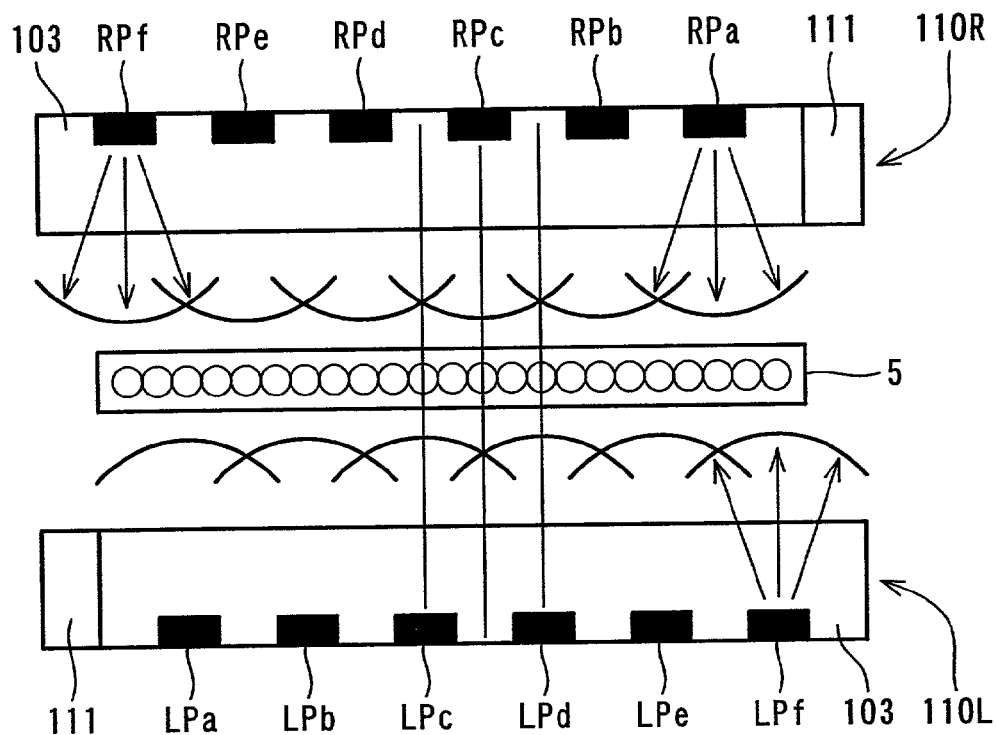
FIG. 12 (b)   Light intensity distribution when document is elevated
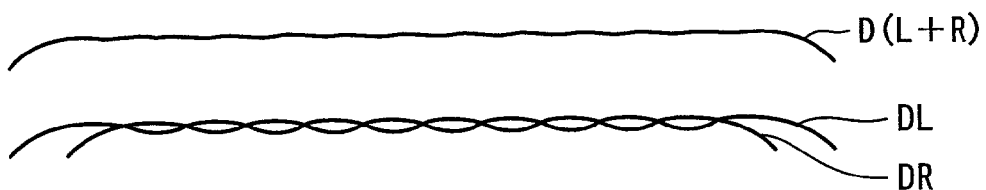
FIG. 12 (c)   Light intensity distribution when document is not elevated
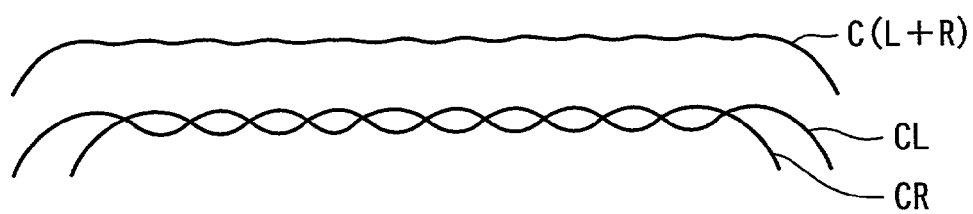

LINE ILLUMINATING DEVICE

BACKGROUND OF THE INVENTION

1. Field of the Invention

The present invention relates to a line illuminating device for linearly illuminating a document in a document-reading device such as a contact-type image sensor.

2. Description of the Prior Art

Equipment such as a facsimile machine, a copying machine and an image scanner is provided with a document-reading device (an image reading device) such as an image sensor as a device for reading a document. One type of the document-reading device used is a contact-type image sensor of which the optical path length is short and which can be easily incorporated in the equipment. In this contact-type image sensor, it is necessary to read the portion to be read of the document by applying light in excess of the intensity of illumination readable by an illuminating device. In this case, the range to be illuminated is quite large in a main-scanning direction (i.e. in the longitudinal direction), but is a narrow, belt-like strip in a sub-scanning direction at right angles to the main-scanning direction.

A line illuminating device using a bar-shaped or plate-shaped light guide for illuminating the above-mentioned long and narrow belt-like range and a document-reading device provided with such a line illuminating device are disclosed in Japanese Unexamined Patent Publication No. Hei 8-163320 or Japanese Unexamined Patent Publication No. Hei 10-126581.

FIG. 24 is a cross-sectional view of a document-reading device which is provided with a conventional line illuminating device. FIG. 25 is an exploded perspective view of the conventional line illuminating device and FIG. 26 is a perspective view showing the structure of a light guide forming the conventional line illuminating device.

The conventional document-reading device comprises, as shown in FIG. 24, a frame 501 in which recesses 501a and 501b are formed, a line illuminating device 510 disposed in the recess 501a, a base plate 504 on which a photoelectric conversion element (a line image sensor) 503 is mounted attached to cover the recess 501b, and a rod lens array 505 held in the frame 501. Light emitted from an emission plane 511a of the line illuminating device 510 is incident on a reading image surface of a manuscript 507 through a cover glass 506 of a document stand. The reflected light is then detected by the photoelectric conversion element 503 through the rod lens array 505 to read the document.

In the line illuminating device 510 as shown in FIG. 25, a light guide 511 is housed in a white casing 512 in such a manner that the emission plane 511a is exposed. Attached to one end of the casing 512 is a light-emitting source base plate 513 which is provided with a light-emitting source consisting of a light-emitting diode (LED) or the like. The light guide 511 is made of glass or transparent resin and is basically rectangular in its cross-section in the direction at right angles to a main-scanning direction (i.e. the longitudinal direction). The light guide 511 has a chamfered C-shaped portion which serves as the emission plane 511a.

As shown in FIG. 26, the light guide 511 is provided, on its reverse surface 511c, with light-scattering patterns 511b for scattering the illuminating light incident from an incident plane 511d. The light-scattering patterns 511b are formed by screen printing a white coating material.

This line illuminating device 510 is arranged in such a manner that light from the light-emitting source such as an LED is introduced from one end (the incident plane) 511d of the light guide 511 into the inside of the light guide 511, the illuminating light spreading through the light guide 511 is scattered at the light-scattering patterns 511b which are formed on the reverse surface 511c of the light guide 511, and then this scattered light is emitted from the emission plane 511a (see FIG. 24).

Intensity of light incident from the light-emitting source is high near the incident plane 511d, while the intensity of light becomes lower as the light-scattering patterns recede from the incident plane. Now, as shown in FIG. 26, it is intended that the intensity of light emitted from the emission plane 511a be uniform over the full length of the main-scanning direction by broadening a forming area of the light-scattering patterns 511b as the light-scattering patterns recede from the incident plane 511d.

As described above, in the conventional line illuminating device 510 as shown in FIGS. 24 through 26, it is intended to provide uniform distribution of the light intensity in the main-scanning direction by shaping of the forming area of the light-scattering patterns 511b which are provided on the light guide, but it is difficult to make the distribution of light intensity completely uniform in the main-scanning direction. Thus, the distribution of light intensity in the main-scanning direction in the conventional line illuminating device often shows a tendency to monotonic increase or monotonic decrease. It is also difficult to make the distribution of light intensity uniform in a sub-scanning direction.

Further, the conventional line illuminating device is constructed, as shown in FIG. 24, to apply illuminating light to the document surface from one direction, and, as a result, if there is any fold or laminating difference in level on the document paper surface, shading may be caused.

FIG. 27 is a cross-sectional view of an other conventional contact-type image sensor and FIG. 28 is a perspective view (showing the condition in which the light guide casing is removed) of the conventional line illuminating device which is used in the contact-type image sensor as shown in FIG. 27. FIG. 29 is a view showing the intensity distribution of light emitted from the line illuminating device as shown in FIG. 28. FIG. 30 is a perspective view showing the positional relationship between the line illuminating device and an image-formation lens in the contact-type image sensor as shown in FIG. 27. FIG. 31 is a plan view showing the positional relationship between the line illuminating device and the image-formation lens in the contact-type image sensor as shown in FIG. 27.

As shown in FIG. 27, the conventional contact-type image sensor 601 comprises a box 602, a line illuminating device 610 incorporated in the box 602, a lens array 605 arranged in the box 602 to serve as the image-formation lens, and a base plate 607 on which a line image sensor 606 (a photoelectric conversion element) is mounted attached to the lower section of the box 602. The line illuminating device 610 comprises a light guide 603, a light guide casing 604 and a light-emitting source base plate 611 as shown in FIG. 28. According to this contact-type image sensor 601, light (illuminating light) emitted from an emission plane 603a of the light guide 603 is incident on a reading surface of a document through a cover glass 608. The reflected light is detected by the line image sensor 606 through the lens array 605 to read the document.

As shown in FIG. 28, the line illuminating device 610 consists of the light guide 603, the light-emitting source base plate 611 provided with a light-emitting source 612 such as a light-emitting diode (LED), and the light guide casing 604 (not shown). FIG. 28 shows the condition in which the light guide casing 604 is removed. The light guide 603 is, as shown in FIG. 27, housed in the white light guide casing 604 in such a manner that the emission plane 603a is exposed. The light guide 603 is made of glass or transparent resin. Shown here is one example of the light guide 603 which has a cross-sectional shape substantially ¼ oval in the direction at right angles to the longitudinal direction. This light guide 603 is provided with an emission plane 603a parallel to the direction of a minor axis of the oval, a plane 603b parallel to the direction of a major axis of the oval, and a reflecting curved surface 603c. Scattering patterns P are formed on the plane 603b parallel to the major axis direction of the oval by printing white coating materials and the like.

The light emitted from the light-emitting source 612 spreads through the inside of the light guide 603 and a part of the light is scattered at the light-scattering patterns P on the light guide surface formed by the white coating materials and the like. The scattered light is reflected at the reflecting curved surface 603c to be radiated to the outside from the emission plane 603a as emitted light.

By covering the light guide 603 with the light guide casing 604, the light emitted outside is caused to reflect at the light guide casing 604 to return it to the inside of the light guide 603. Thus, loss of scattered light is reduced and as a result, intensity of the emitted light is improved. The light-scattering patterns P are formed at a position near the focal point of the plane 603b parallel to the major axis direction of the oval. With this, the light scattered by the light-scattering patterns P is reflected at the reflecting curved surface 603c and is concentrated on the document-reading surface. As a result, it is possible to improve the intensity of light on the document-reading surface.

As shown in FIG. 29, each light intensity distribution Ba~Bf is formed by each light-scattering pattern Pa~Pf. The light intensity distribution C of FIG. 29 shows a result that each intensity distribution Ba~Bf from each light-scattering pattern Pa~Pf is propagated by a distance L0 and then has been compounded, while the light intensity distribution D shows a result in which each intensity distribution Ba~Bf from each light-scattering pattern Pa~Pf is further propagated by a distance ΔL0 and has been compounded.

As shown in FIG. 30, an X-Y plane (the surface of the cover glass 608 as shown in FIG. 27) is situated immediately above an optical axis of the lens array 605. The paper surface (the reading surface of the document) is illuminated by the emitted light from the light guide 603 of the line illuminating device 610. The light intensity distribution of the irradiated light in the X-Y plane exhibits the characteristics shown by the reference mark C in FIG. 29.

As shown in FIG. 29, in the line illuminating device 610 in which the light-scattering patterns Pa~Pf are intermittently formed over the longitudinal direction (the main-scanning direction) of the light guide 603, unevenness corresponding to the intervals between the light-scattering patterns Pa~Pf.is caused in the light intensity distribution of the emission light. The unevenness of the light intensity distribution results in unevenness of the reading image. It is therefore desired to provide the line illuminating device with less unevenness in the light intensity distribution.

On the other hand, sensitivity of the line image sensor 606 also varies for each picture element. Accordingly, it may be necessary to correct, by image processing (what is called shading correction), the unevenness of the light intensity distribution of the line illuminating device and variation of sensitivity in the line image sensor. Specifically, an image is read in such a condition that for example, a white document is closely applied to the surface of the cover glass 608 and an output for each picture element of the image sensor 606 is determined. Based on the output for each picture element, a total correction amount (or correction factor) of the unevenness of the intensity distribution of the light source and the variation of sensitivity for each picture element of the image sensor 606 is computed. The computed correction amount is stored for each picture element. When the document is read, the above-mentioned correction amount is corrected for the output of each picture element of the image sensor 606. With this, it is possible to solve the unevenness of the intensity distribution of the light source and the variation of sensitivity for each picture element of the image sensor 606.

However, due to the fold or backward bending of the document, there is some possibility that the reading surface of the document is elevated from the X-Y plane (the cover glass surface). When the document surface is displaced due to the elevation of the document and the like, amplitude of the unevenness of the light intensity distribution (the amplitude of the swell of characteristics as shown by the reference mark C) changes in addition to an entire change of quantity of light. As a result, unevenness is caused in the reading image.

Accordingly, it is desired to provide a line illuminating device which can provide a uniform light intensity distribution in the main-scanning direction and in which unevenness is not easily produced on the reading image even if the distance between the document surface and the light source changes because of elevation of the document surface.

SUMMARY OF THE INVENTION

In a conventional line illuminating device using a light guide, there is a limit to providing a uniform distribution of light intensity of illuminating light. Further, there is some possibility in the conventional line illuminating device that shading is produced when there is a fold, laminating difference in level, or the like on the surface of a document paper Still further, in the conventional line illuminating device, there is a possibility that unevenness in the reading image is caused when the document is elevated.

The primary object of the present invention is to overcome the above-mentioned problems and to provide a line illuminating device which comprises two illuminating units, each consisting of a light guide and a light-emitting source provided at one end of the light guide, wherein these illuminating units are symmetrically arranged to provide a uniform distribution of light intensity in a main-scanning direction, to equalize distribution of light intensity in a sub-scanning direction, and to increase quantity of light. Another object of the present invention is provide a line illuminating device in which shading is not easily produced on the surface of a document even when the document surface is not flat. A further object of the present invention is to provide a line illuminating device which can provide a more uniform distribution of light intensity in the main-scanning direction and in which unevenness is not easily produced on a reading image even if the distance between a document surface and a light source is changed by an elevation in the document surface.

Namely, according to a line illuminating device of the present invention, two light guides are arranged in such a manner that light emitted from an emission plane of each light guide illuminates the same area of a document-reading surface, wherein one light guide is provided with a light-emitting source at one end, while the other light guide is provided with a light-emitting source at its other end.

A light-emitting source is respectively provided on the opposite sides of the light guides and the emitted light from each light guide is designed to illuminate the same area of the document-reading surface. It is therefore possible to provide a uniform distribution of light intensity in the main-scanning direction, to equalize the distribution of light intensity in the sub-scanning direction, and to increase the quantity of light.

Each light guide may be used uncovered as is. However, the light guide may be incorporated in the line illuminating device in such a condition that the light guide is housed in a casing so that at least its emission plane is exposed.

The light guide is formed with light-scattering patterns for scattering the illuminating light on a predetermined surface except for the incident plane and the emission plane thereof. However, when the light guide is housed in the casing, the light-scattering patterns can also be formed on the casing.

A line illuminating device according to the present invention comprises a pair of light guides which are arranged in such a manner that light from a light source incident from an end surface is guided in the longitudinal direction and is scattered in light-scattering patterns which are intermittently formed over the longitudinal direction to illuminate the same area of a document-reading surface, wherein the light-scattering patterns are alternately arranged so that the light-scattering patterns formed on one light guide compensate for the shortage of light-scattering patterns formed on the other light guide.

Because the light-scattering patterns are alternately arranged between each light guide, compounded light intensity distribution is provided in such a manner that the peak of light intensity distribution of the light-scattering patterns of one light guide offsets the dip of light intensity distribution of the light-scattering patterns of the other light guide. Thus, unevenness (amount of variation) of the light intensity becomes small, while uniformity is improved.

Each light guide may be symmetrically arranged relative to a plane where the emission plane meets at right angles to the document-reading surface. By applying light onto the paper surface from two directions, it is possible to eliminate the shading which is produced when the light is applied on the fold, laminating difference in level or the like of the paper surface from one direction.

Further, in a condition where each light guide is arranged so that light emitted from each emission plane illuminates the same area of the document-reading surface, one light guide may be provided with a light-emitting source at one end in the longitudinal direction, while the other light guide may be provided with a light-emitting source at the other end in the longitudinal direction. In this manner, it is possible to provide uniform light intensity distribution.

A line illuminating device according to the present invention comprises two line illuminating units, each housing a light guide in a casing, in which tile light guide is adapted to guide light from a light source incident from an end in the longitudinal direction and to scatter the light in light-scattering patterns which are formed along the longitudinal direction to emit this light from the emission plane, characterized in that each line illuminating unit is arranged in such a manner that the light emitted from each emission plane of each light guide illuminates the same area of a document-reading surface, and the light guide casing has at least a part of its outside surface treated to control scattering and reflection of the light.

The line illuminating device according to the present invention is characterized in that the light guide casing has at least a part of its outside surface covered by a member for controlling scattering and reflection the light.

Since at least a part of the outside surface of the light guide casing is provided with a coating film for controlling scattering and reflection of the light or is covered by the member for controlling scattering and reflection of the light, it is possible to prevent the light scattered and reflected from the document surface from being scattered and reflected again at the light guide casing. With this, irradiation by the light scattered and reflected at the light guide casing on the document surface is eliminated. Accordingly, the original intensity distribution of the illuminating light is not disturbed by the scattered and reflected light from the light guide casing and as a result, an image can be clearly read.

BRIEF DESCRIPTION OF THE DRAWINGS

The above and other objects, features and advantages of the present invention will become more apparent from the following description when taken in conjunction with the accompanying drawings.

FIGS. 3(a), 3(b) and 3(c) are graphs showing distribution of light intensity in a main-scanning direction in a document-reading surface;

FIGS. 4(a) and 4(b) are graphs showing spatial distribution of light intensity in a sub-scanning direction;

FIGS. 12(a), 12(b) and 12(c) are views showing am arrangement of light-scattering patterns and distribution light intensity in the line illuminating device according to the sixth embodiment of the present invention;

DETAILED DESCRIPTION OF THE PREFERRED EMBODIMENTS

Figure 1:
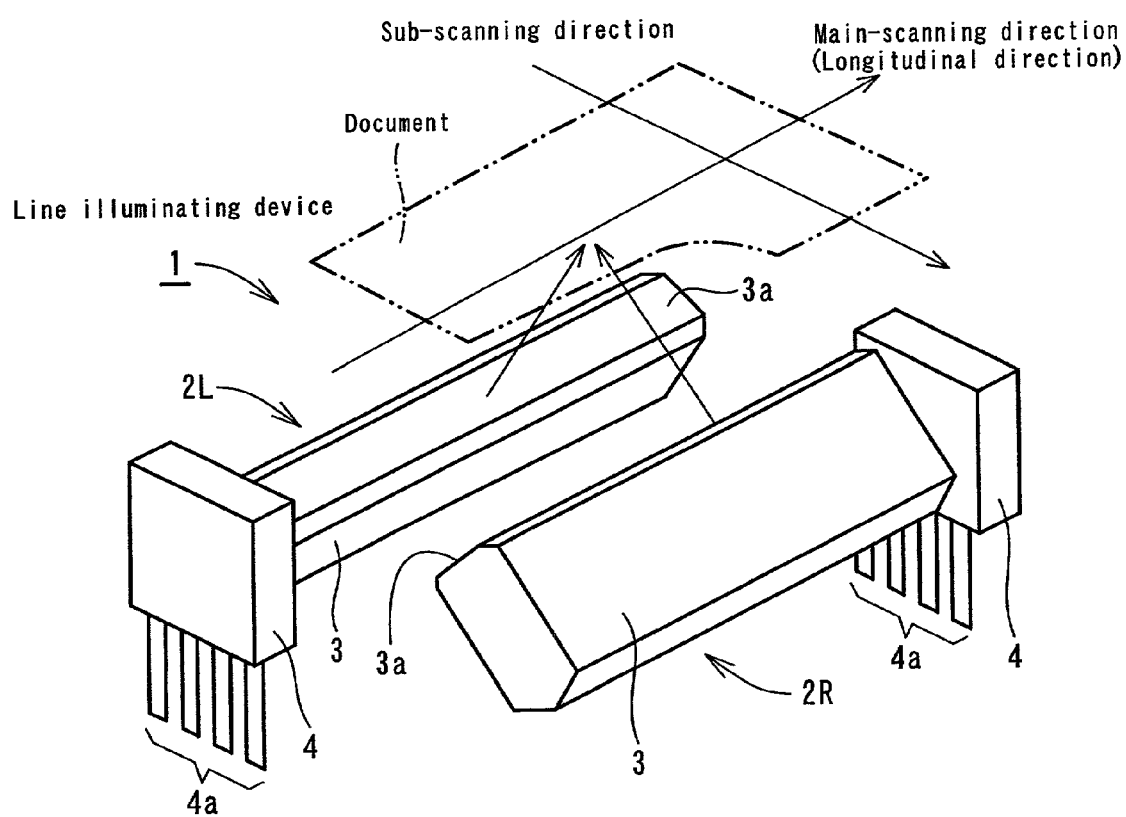
FIG. 1 is a perspective view of a line illuminating device according to a first embodiment of the present invention.

FIG. 1 is a perspective view showing a first embodiment of a line illuminating device according to the present invention. As show in FIG. 1, the line illuminating device 1 has two illuminating units 2L and 2R alternately arranged. Each illuminating unit 2L and 2R has a light-emitting source base plate 4 attached to one end of a light guide 3.

The light guide 3 is made of a resin with high light-transmission properties such as acryl and polycarbonate or an optical glass with high light-transmission properties. The cross-sectional shape of the light guide 3 is polygonal and one side is adapted to serve as an emission plane 3a. Light-scattering patterns (not shown) are formed on the surface opposite to the emission plane 3a.

The light-emitting source base plate 4 is provided with one or a plurality of surface mounting type light-emitting diodes (LED) as a light-emitting source (not shown) and light from these light-emitting diodes is incident from an end surface of the light guide 3. Reference numeral 4a is a group of terminals for supplying the light-emitting source with electric power.

The light guide 3 serves to reflect the light incident from the end surface at its internal surface to guide this light in a main-scanning direction (the longitudinal direction) and emit the light from the emission plane 3a. Each illuminating unit 2L and 2R is arranged so that the light emitted from the emission plane 3a irradiates the same area on a document-reading surface and the light-emitting source is situated on the opposite side from the main-scanning direction (the longitudinal direction).

Figure 2:
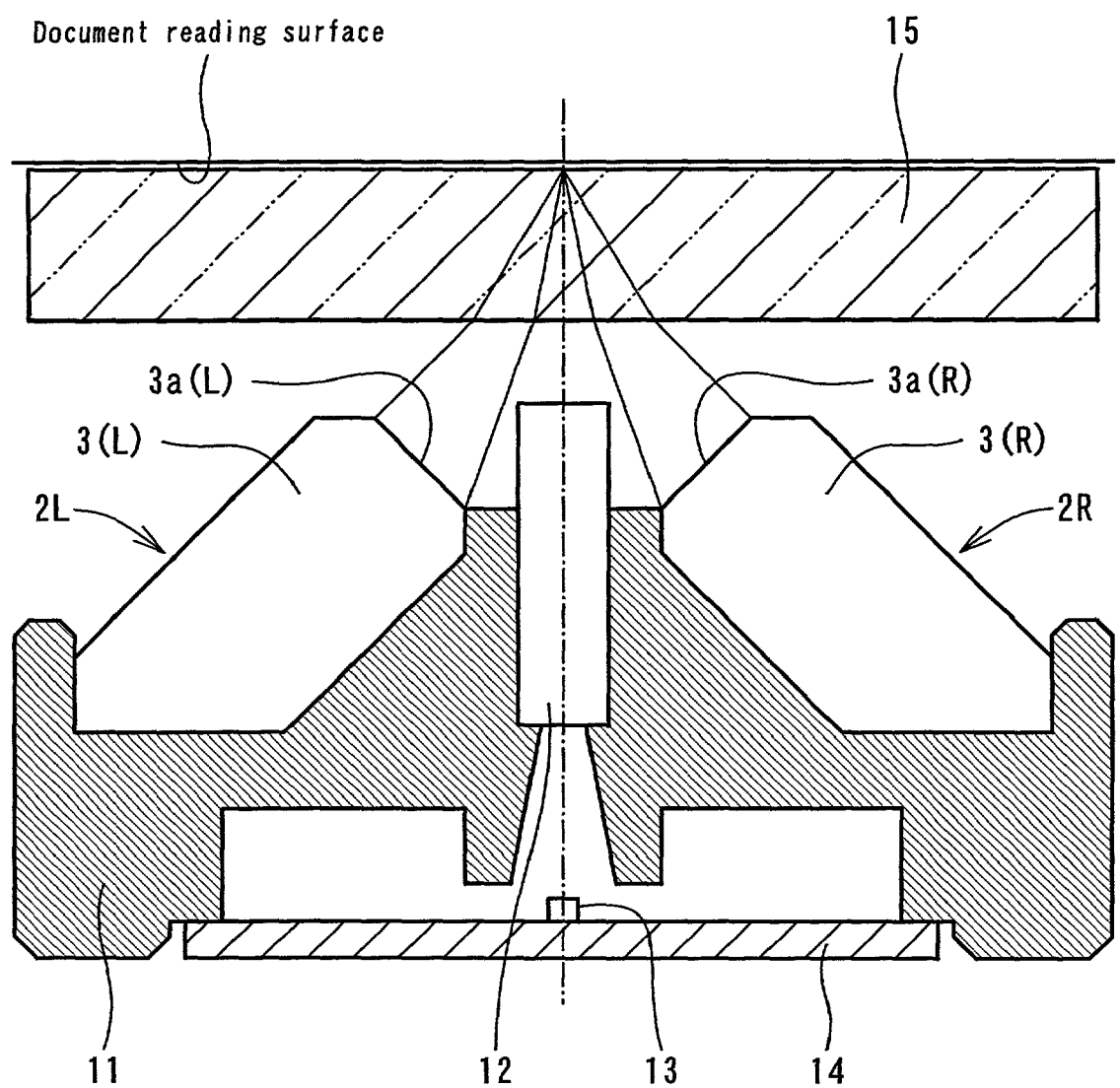
FIG. 2 is a cross-sectional view of a document-reading device incorporating the line illuminating device as shown in FIG. 1.

FIG. 2 is a cross-sectional view of a document-reading device incorporating the line illuminating device shown in FIG. 1. The document-reading device shown in FIG. 2 comprises a frame 11, each lighting unit 2L and 2R and a rod lens array 12 which are secured to the frame 11, and a base plate 14 on which a photoelectric conversion element (an image sensor) 13 is mounted attached to the frame 11. Reference numeral 15 is a cover glass of a document stand.

The light guides 3(L) and 3 (R) are symmetrically arranged relative to a surface where the emission planes 3a (L) and 3a (R) are at right angles to a document-reading surface. Accordingly, the emission light from the emission plane 3a (L) of the left light guide 3 (L) illuminates the document-reading surface from the left side, while the emission light from the emission plane 3a (R) of the right light guide 3 (R) illuminates the document-reading surface from the right side. The reflected light at the document-reading surface is detected by the photoelectric conversion element 13 through the rod lens array 12.

As shown in FIGS. 1 and 2, by applying illuminating light to the document-reading surface from two directions, it is possible to eliminate shade produced when light is applied to a fold or laminating difference in the level of a paper surface as an object to be irradiated from one direction.

FIG. 3 is a graph showing the light intensity distribution in the main-scanning direction on the document-reading surface. FIG. 3(a) shows the light intensity distribution in the main-scanning direction when only the left-illuminating unit 2L is used and FIG. 3(b) shows the light intensity distribution in the main-scanning direction when only the right-illuminating unit 2R is used. FIG. 3(c) shows the light intensity distribution in the main-scanning direction when both illuminating units 2L and 2R are used. In each of the two graphs, the vertical axis shows the light intensity (relative value) and the horizontal axis shows the main-scanning direction coordinates (relative value). The value of the horizontal axis is set at 0 at the left end of a main-scanning range (or an effective illuminating range) and is set at 2000 at the right end of the main-scanning range (or an effective illuminating range).

In the left illuminating unit 2L, because the light-emitting source is arranged on the 0 side of the main-scanning direction coordinates, as shown in FIG. 3(a), the light intensity is high on this 0 side. In the right illuminating unit 2R, because the light-emitting source is arranged on the 2000 side of the main-scanning direction coordinates, as shown in FIG. 3(b), the light intensity is high on this 2000 side. Accordingly, if the illuminating light from both illuminating units is compounded, as shown in FIG. 3(c), gradient components of the primary approximate term are eliminated, and uniformity of the light intensity in the main-scanning direction is improved.

The uniformity of the light intensity can be quantitatively demonstrated by the value for uniformity shown by the following formula.

Uniformity=(I max−I min)/(I max+I min)

where I max is a maximum value for the light intensity distribution and I min is a minimum value for the light intensity distribution.

FIG. 4 is a graph showing spatial light intensity distribution in a sub-scanning direction. FIG. 4(a) shows the light intensity of the left illuminating unit 2L, in which a solid line shows light intensity distribution in the sub-scanning direction near the light-emitting source, while a dotted line shows light intensity distribution at the finishing end (the end opposite to the end where the light-emitting source is attached). FIG. 4(b) shows light intensity distribution in the sub-scanning direction at the right end position (the position where the value of the main-scanning direction coordinate as shown in FIG. 3 is 2000) in the main-scanning range (or an effective illuminating range) when both illuminating units 2L and 2R are used, in which a dotted line shows light intensity distribution in the sub-scanning direction at the finishing end of the left illuminating unit 2L, a solid line shows light intensity distribution in the sub-scanning direction at the light-emitting source side of the right illuminating unit 2R, and a thick solid line shows light intensity distribution in the sub-scanning direction at the right end position (the position where the value of the main-scanning direction coordinate as shown in FIG. 3 is 2000) in the main-scanning range when both illuminating units 2L and 2R are used. In FIGS. 4(a) and (b), the horizontal axis shows the sub-scanning direction coordinates (relative value) and the vertical axis shows the light intensity (relative value). A position directly above the photoelectric conversion element (sensor) 13 as shown in FIG. 2 is set at 0 for the sub-scanning direction coordinates (relative value).

As shown in FIG. 4(a), light intensity distribution in the sub-scanning direction for each illuminating unit 2L and 2R shows sharp characteristics on the light-emitting source side, but shows broad characteristics at the finishing end (the end furthest from the light-emitting source). The light intensity distribution in the sub-scanning direction shows asymmetric characteristics. Now, by compounding the light emitted from each illuminating unit 2L and 2R where the light-emitting sources are opposedly arranged, as shown by the thick solid line in FIG. 4(b), light intensity distribution in the sub-scanning direction exhibits sharp characteristics and asymmetry of light intensity distribution in the sub-scanning direction is mitigated. Further, in its full width at half maximum, large variations are eliminated relative to the main scanning direction.

Accordingly, by using the line illuminating device according to the present invention, it is possible not only to provide uniform light intensity in the main-scanning direction, but also to equalize the light intensity distribution in the sub-scanning direction. In this manner, it is possible to satisfactorily read the image and the like on the manuscript surface.

The line illuminating device according to the first embodiment as shown in FIG. 1 is constructed so that the light guide is not covered by the casing, but may be constructed so that the light guide is covered with a casing. The shape of the light guide can be selectively chosen.

Figure 5:
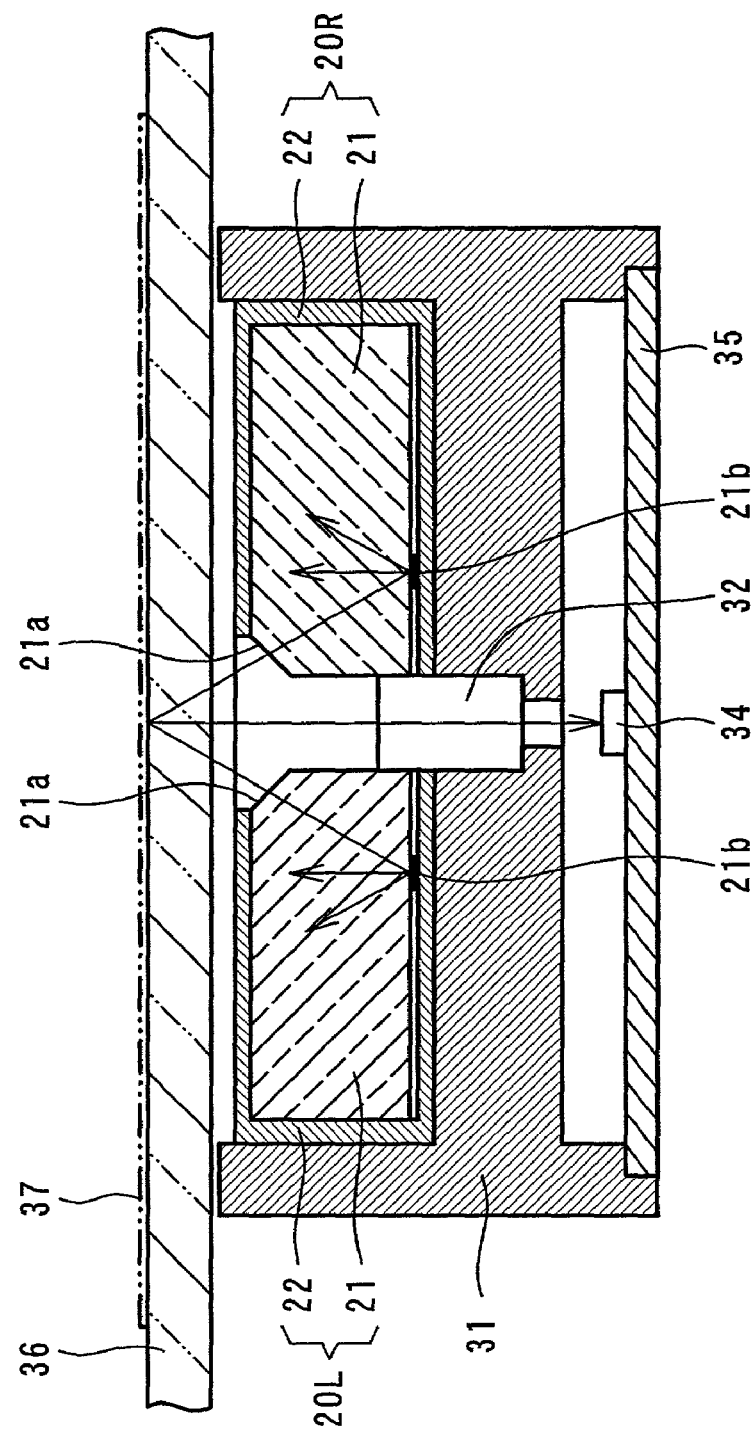
FIG. 5 is a cross-sectional view of a document-reading device incorporating a line illuminating device (a line illuminating device provided with two illuminating units with a casing) according to a second embodiment of the present invention.

FIG. 5 is a cross-sectional view of a document-reading device incorporating a line illuminating device (the line illuminating device according to a second embodiment) provided with two illuminating units with a casing. The document-reading device as shown in FIG. 5 comprises a frame 31 provided with two illuminating units 20L and 20R and a rod lens array 42, and a base plate 35 provided with a photoelectric conversion element (an image sensor) 34 mounted on the lower opening portion of the frame 31. Reference numeral 36 is a glass plate for a document stand and reference numeral 37 is a manuscript.

Figure 25:
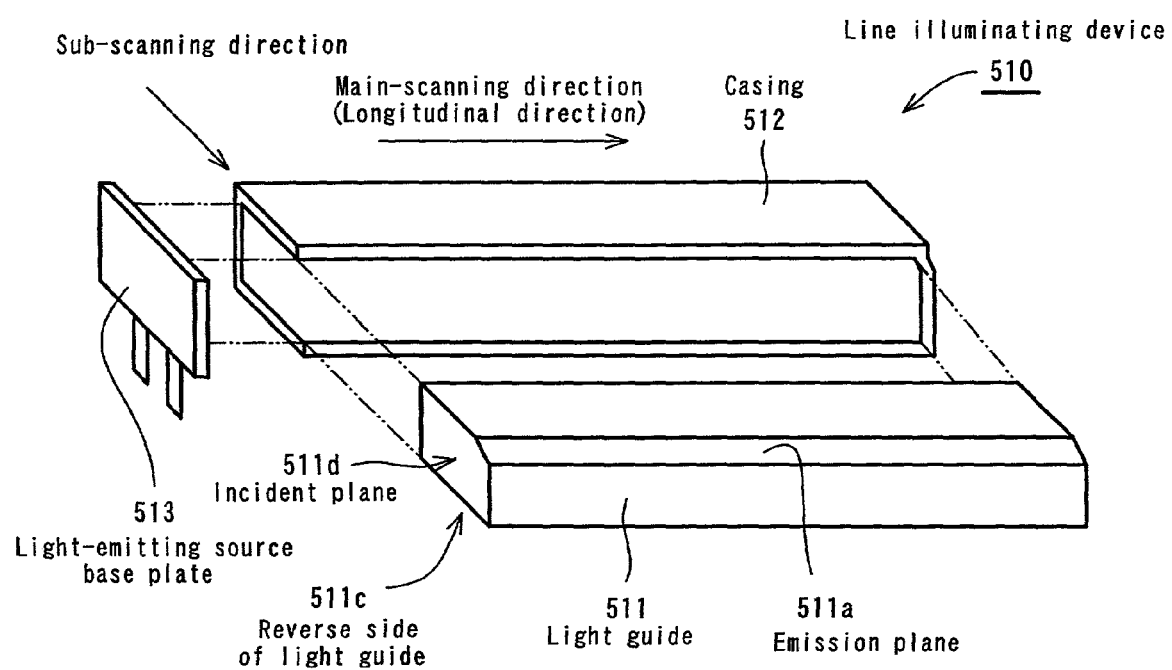
FIG. 25 is an exploded perspective view of the conventional line illuminating device as shown in FIG. 24.
Figure 26:
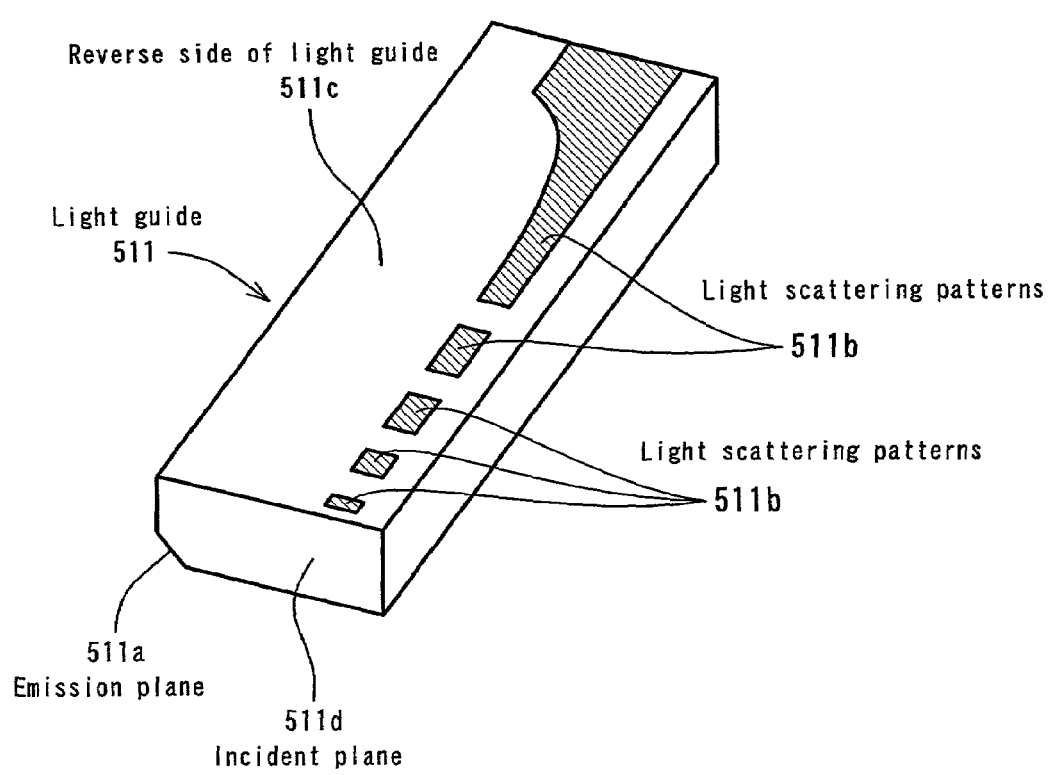
FIG. 26 is a perspective view showing a structure of a light guide forming the conventional line illuminating device as shown in FIG. 24.

Each illuminating unit 20L and 20R comprises a light guide 21, a white casing 22 for covering the light guide 21, and a light-emitting source base plate provided with a light-emitting source (not shown). Reference numeral 21a is an emission plane and reference numeral 21b designates light-scattering patterns. The structure of each illuminating unit 20L and 20R is the same as that of the conventional illuminating device shown in FIGS. 25 and 26. In the line illuminating device according to a second embodiment, two illuminating units 20L and 20R are arranged so that the light emitted from each irradiates the same area of a document-reading surface and the light-emitting source is opposedly situated. Since the line illuminating device according to the second embodiment is arranged in such a manner that the casing 22 prevents the scattered light from being uselessly emitted outside of the light guide, intensity of the illuminating light can be increased to a greater value than that of the line illuminating device without the casing.

In the line illuminating devices according to the first and second embodiments, two illuminating units are symmetrically arranged relative to a plane where each emission plane is at right angles to the document-reading surface. However, the two illuminating units may be arranged in close contact or in adjacent positions. With this arrangement, the line illuminating device can be made compact and thus the document-reading device can also be made compact.

Figure 6:
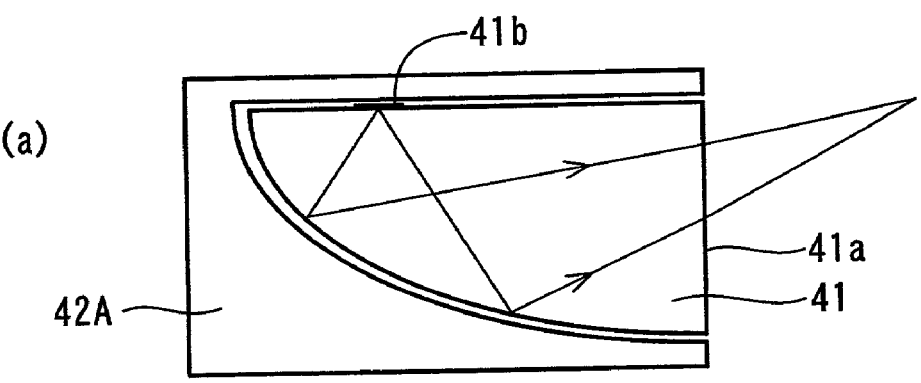
FIGS. 6(a), 6(b) and 6(c) are cross-sectional views of a line illuminating device according to a third embodiment of die present invention.
Figure 6:
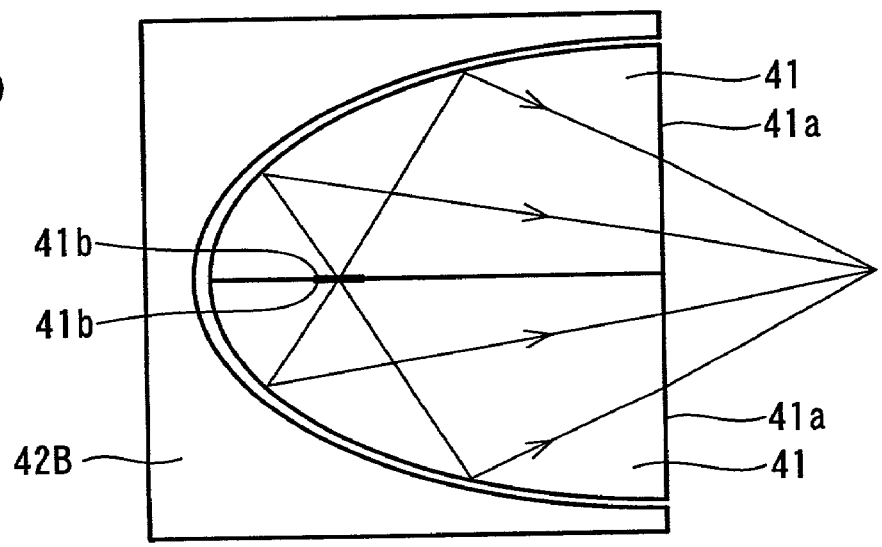
Figure 6:
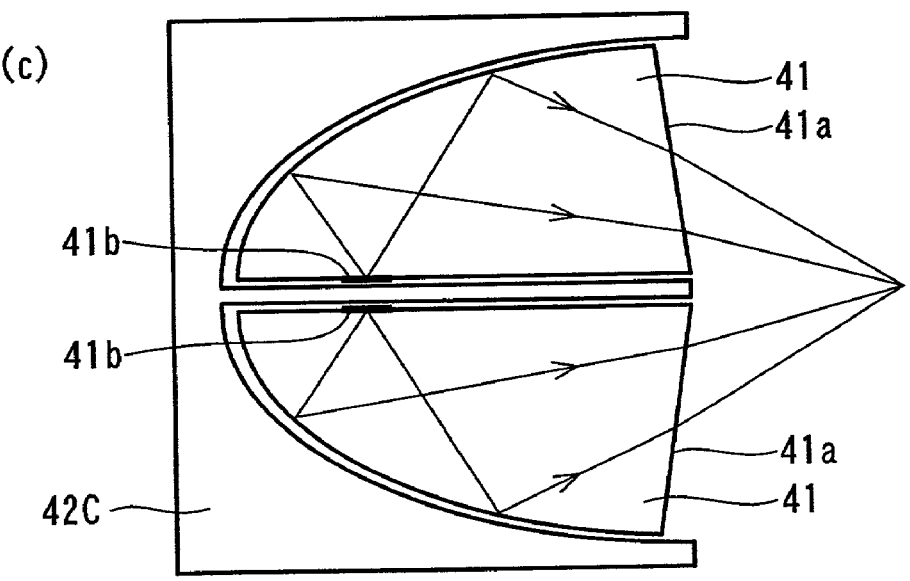
Figure 7:
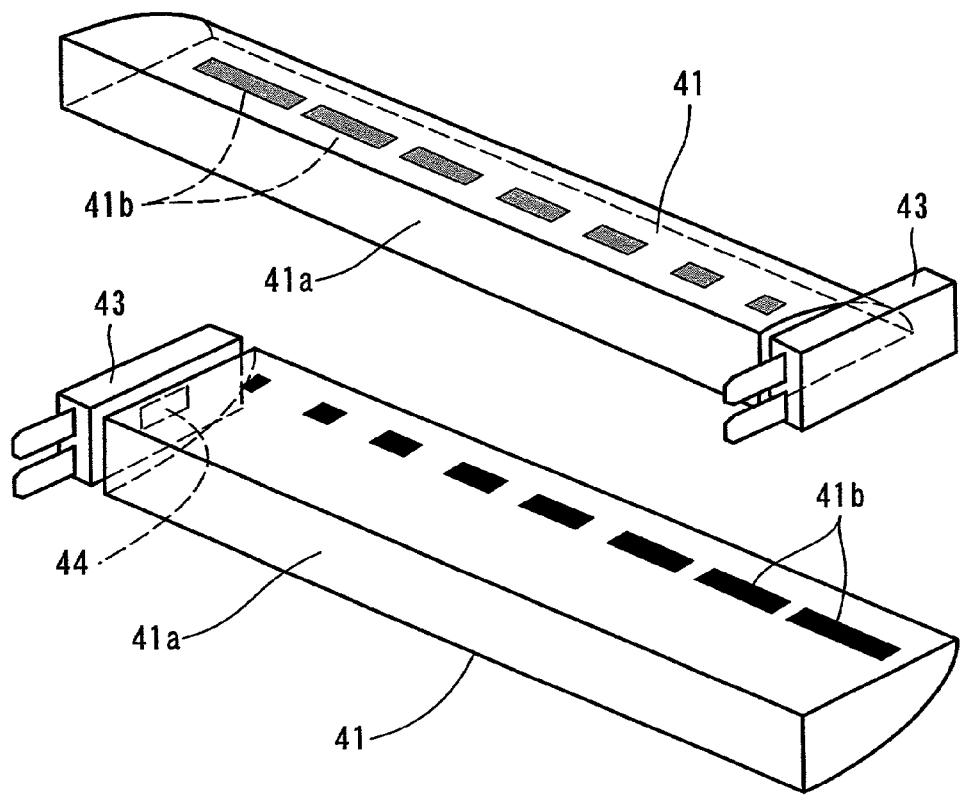
FIGS. 7(a) and 7(b) are perspective views of the line illuminating device according to the third embodiment of the present invention.
Figure 7:
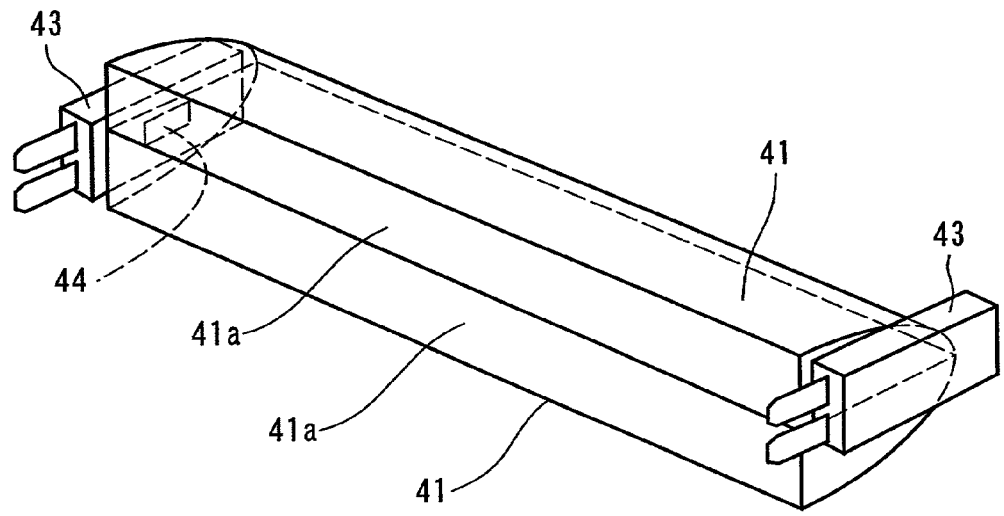

FIG. 6 is a cross-sectional view of a line illuminating device according to a third embodiment of the present invention and FIG. 7 is a perspective view of the line illuminating device according to this third embodiment. FIG. 6(a) shows the cross-sectional structure of a single illuminating unit and FIGS. 6(b) and (c) show the cross-sectional structure of the line illuminating device according to the present invention. FIG. 7(a) shows a condition where two illuminating units are separated, while FIG. 7(b) shows a condition where two illuminating units are combined. In FIG. 7, a casing for covering the light guide is omitted.

As shown in FIG. 6(a), the single illuminating unit is arranged in such a manner that the light guide 41 is covered by a casing 42A. The light guide 41 has a cross-sectional shape forming a part of an oval along a plane at right angles to the longitudinal direction (the main-scanning direction). Specifically, the oval is divided into quarters, in which a plane including the major axis of the oval, a plane including the minor axis of the oval, and a curved surface including the peripheral edge of the oval form the side surface of the light guide 41.

In this light guide 41, the plane including the minor axis of the oval serves as an emission plane 41a. The plane including the major axis of the oval is provided with light-scattering patterns 41b. As described above, the curved surface is a part of the oval and if this curved surface is a concave mirror, its focus is on the plane including the major axis of the oval. Thus, the light-scattering patterns 41b are formed to coincide with the focus. Since the light-scattering patterns 41b have a certain width, to put it more precisely, the light-scattering patterns 41b are formed near the focus.

The light-scattering patterns 41*b* are formed by printing white coating materials. However, the color is not limited to white. Various colors may be used according to the wavelength of the light used. For example, in a facsimile machine and the like, a wavelength of 570 nm is often used. In this case, the color of this wavelength may be used. Further, the light-scattering patterns 41*b* are not necessarily formed by printing the coating material, but may be formed by laminating a film with a predetermined color.

As shown in FIG. 7(*a*), the light-scattering patterns 41*b* are formed in discontinuous belt-like shape, wherein the intervals between each pattern 41*b* gradually become shortened from one end of the light guide 41 where the light-emitting source base plate 43 provided with a light-emitting source (e.g. a light-emitting diode) 44 is arranged, toward the other end of the light guide 41. With such a shape, uniformity in the quantity of scattered light in the longitudinal direction (the main-scanning direction) of the light guide 41 is improved. It is to be noted that the shape of the light-scattering patterns 41*b* may be continuous belt-like and the width may be gradually broadened from one end toward the other end.

In the line illuminating device according to a third embodiment, two light guides 41 (illuminating units) are, as shown in FIG. 6(*b*), closely connected to each other and housed in a casing 42B. Also, as shown in FIG. 6(*c*), each light guide 41 (illuminating unit) may be integrally housed in its own housing portion formed in the casing 42C. The light guide 41 as shown in FIG. 6(*c*) is arranged so that the plane serving as the emission plane 41*a* does not coincide with the minor axis of the oval, but is positioned at a specific angle to the minor axis to shift the focus position.

Figure 8:
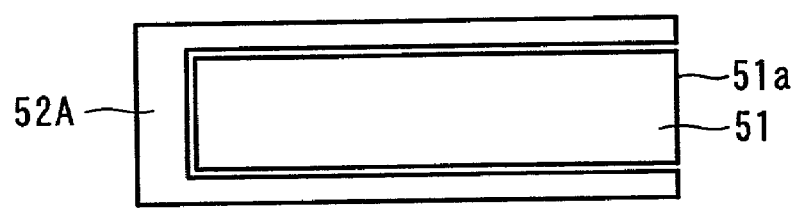
FIGS. 8(a), 8(b) and 8(c) are cross-sectional views of a line illuminating device according to a fourth embodiment of the present invention.
Figure 8:
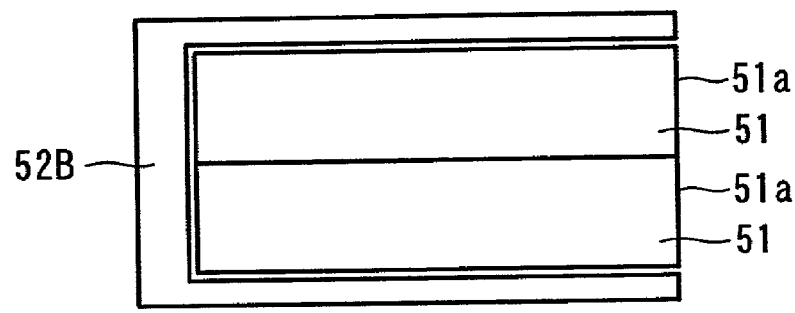
Figure 8:
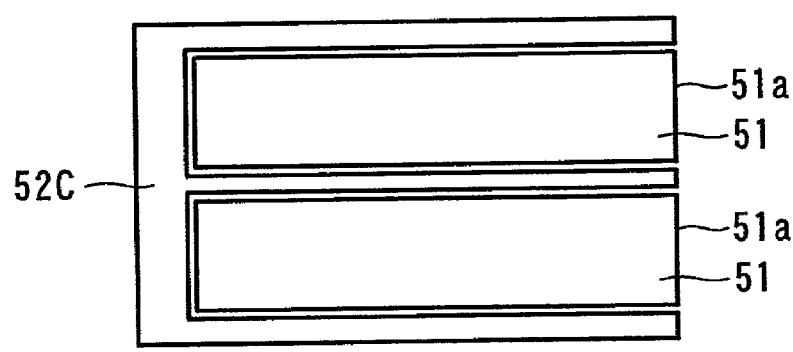
Figure 9:
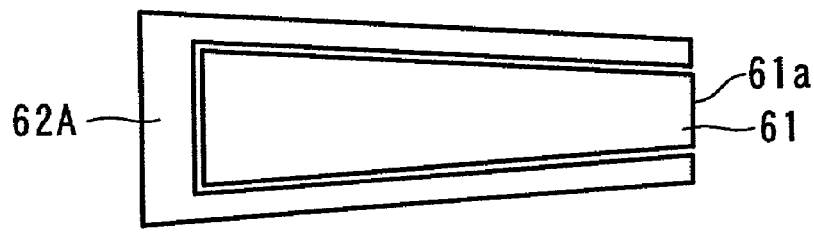
FIGS. 9(a), 9(b) and 9(c) are cross-sectional views of a line illuminating device according to a fifth embodiment of the present invention.
Figure 9:
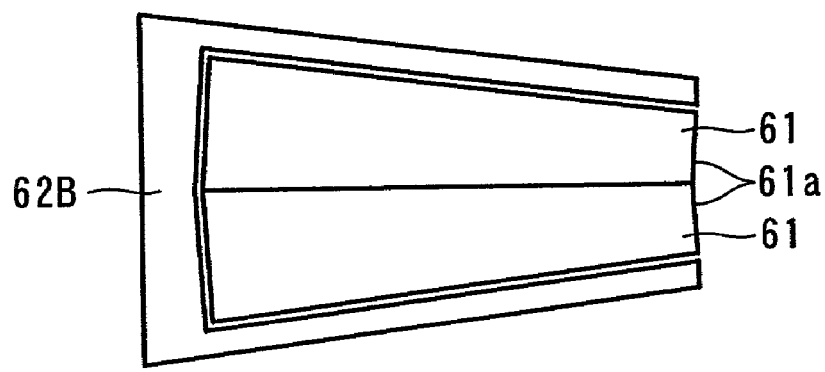
Figure 9:
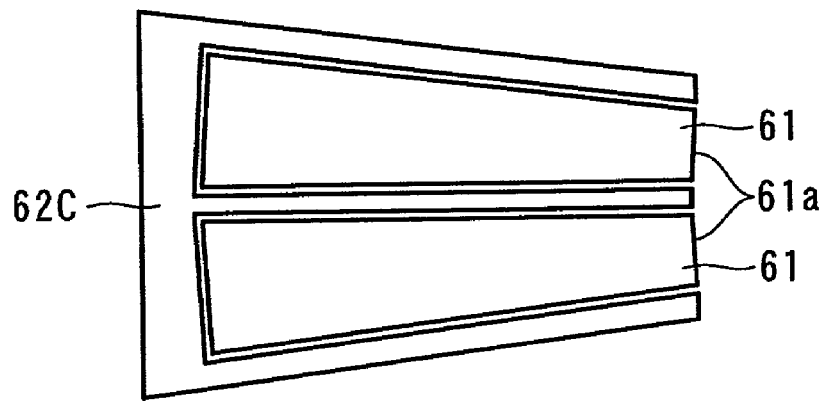

FIG. 8 is a cross-sectional view of a line illuminating device according to a fourth embodiment and FIG. 9 is a cross-sectional view of a line illuminating device according to a fifth embodiment. FIG. 8(*a*) shows the cross-sectional structure of a single illuminating unit and FIGS. 8(*b*) and (*c*) show the cross-sectional structure of the line illuminating device according to the present invention. Similarly, FIG. 9(*a*) shows the cross-sectional structure of a single illuminating unit and FIGS. 9(*b*) and (*c*) show the cross-sectional structure of the line illuminating device according to the present invention. As shown in FIGS. 8 and 9, the cross-sectional shape of the light guides 51 and 61 may be rectangular or trapezoidal. The light guides 51 and 61 may also be round or of a shape such as a paraboloid. Thus, the shape is not limited to any specific one. In FIG. 8, reference numeral 51*a* is an emission plane, reference numerals 52A, 52B, and 52C are casings. In FIG. 9, reference numeral 61(*a*) is an emission plane and reference numerals 62A, 62B, and 62C are casings.

As described above, according to the present invention, two illuminating units are provided, each comprising the light guide and the light-emitting source attached to one end surface of this light guide. Each illuminating unit is arranged in such a manner that the light emitted from each of the emission planes irradiates the same area of the document-reading surface, and the light-emitting source is positioned on the opposite side in the longitudinal direction. Accordingly, characteristics of each illuminating unit can be offset and as a result, it is possible to provide uniform light intensity distribution in the main-scanning direction, to equalize the light intensity distribution in the sub-scanning direction, and to provide an increase in quantity of light.

Further, when each light guide is symmetrically arranged relative a plane where the emission plane of each light guide is at right angles to the document-reading surface, it is possible to make it more difficult to produce shading on the document surface even if there is a fold, or laminating difference in level or the like on the document as the object to be irradiated. Accordingly, even if there is a fold, or laminating difference in level or the like on the document, it is possible to read the document image satisfactorily.

Figure 10:
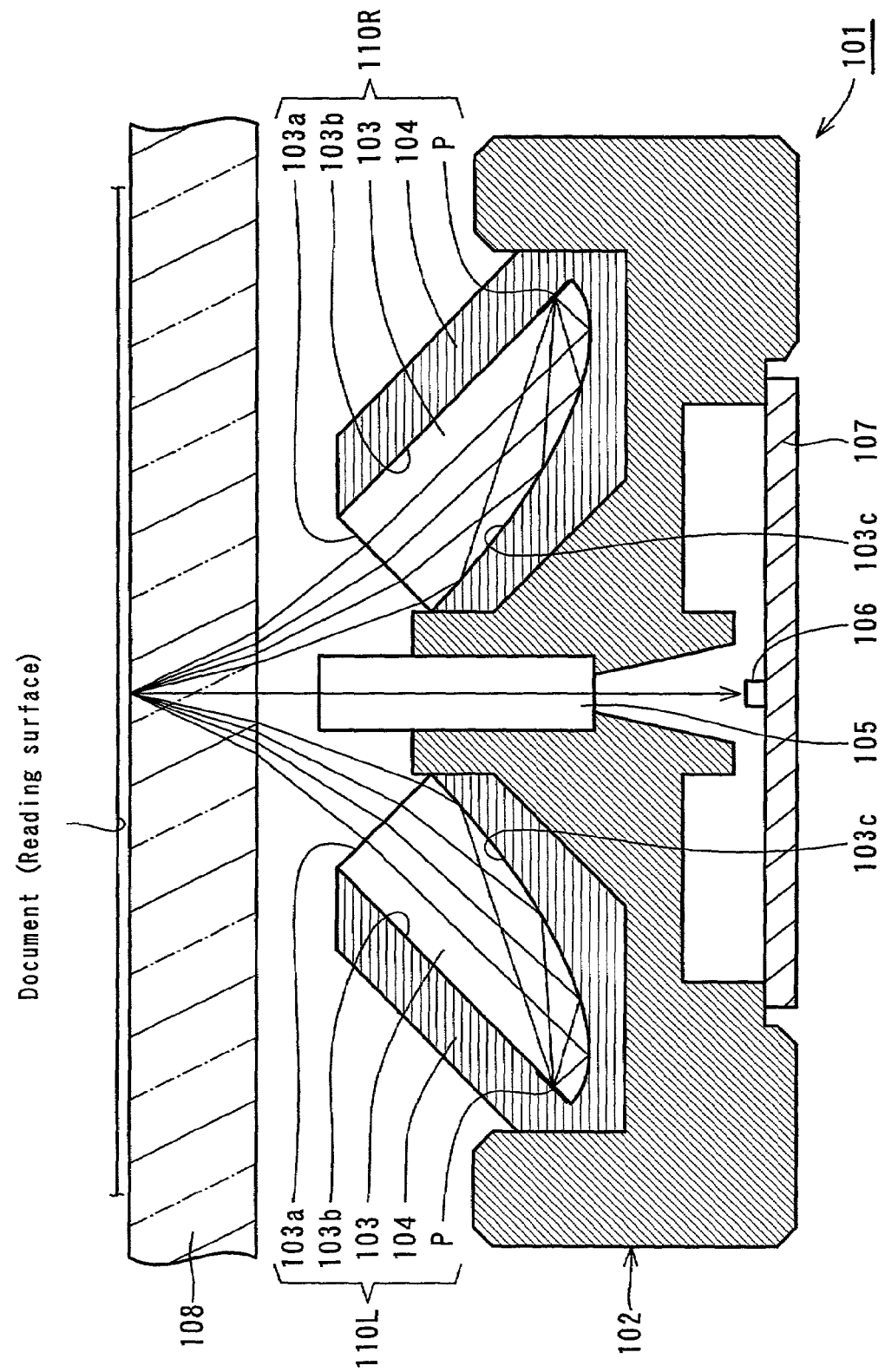
FIG. 10 is a cross-sectional view of a contact-type image sensor to which a line illuminating device according to a sixth embodiment of the present invention is applied.
Figure 11:
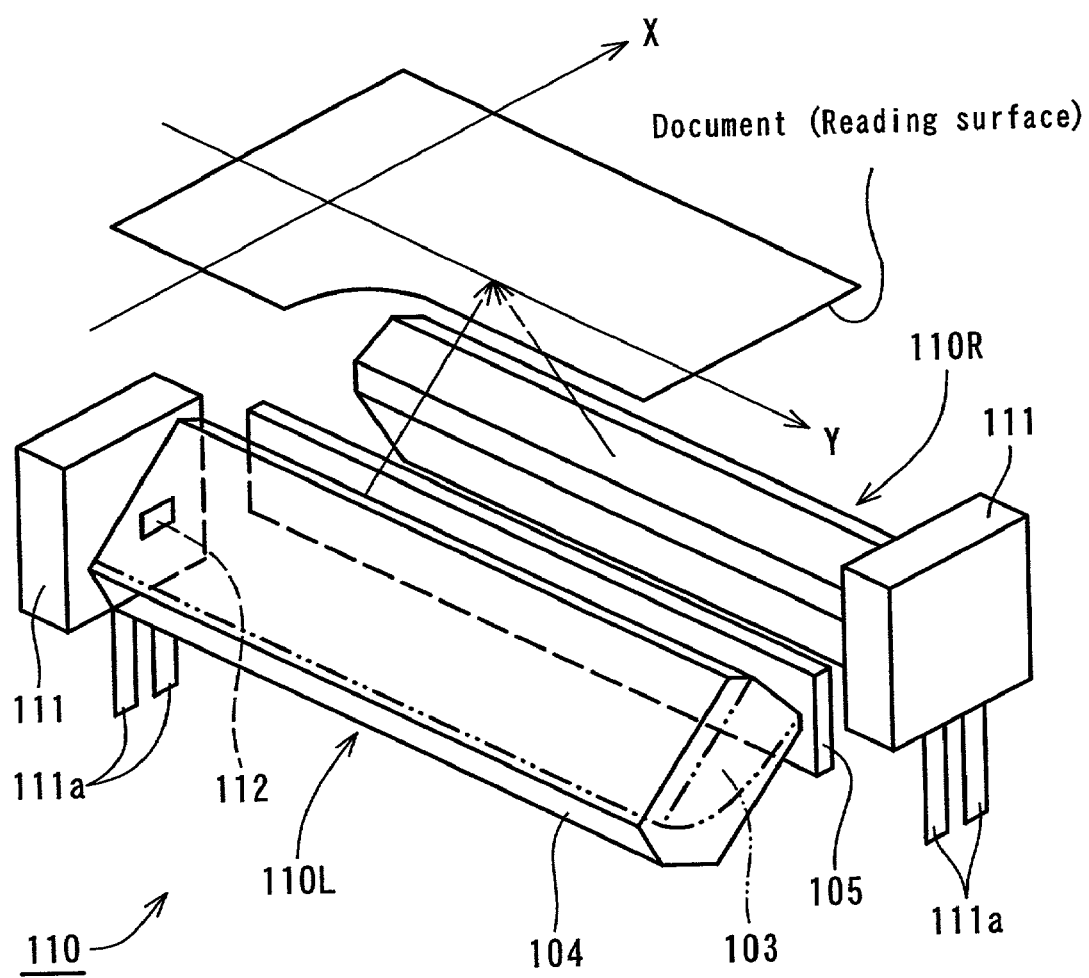
FIG. 11 is a perspective view of the line illuminating device according to the sixth embodiment of the present invention.

FIG. 10 is a cross-sectional view of a contact-type image sensor to which a line illuminating lighting device according to a sixth embodiment of the present invention is applied. FIG. 11 is a perspective view of the line illuminating device according to the sixth embodiment of the present invention. FIG. 12 is a view showing the arrangement of light scattering patterns and light intensity distribution in the line illuminating device according to the sixth embodiment of the present invention.

As shown in FIG. 10, a contact-type image sensor 101 to which the line illuminating device according to the sixth embodiment is applied is provided with a box 102 in which two illuminating units 110L and 110R are incorporated. The box 102 also houses a lens array 105 therein. Attached to a lower portion of the box 102 is a base plate 107 which is provided with a line image sensor (a photoelectric conversion element) 106. Reference numeral 108 is a cover glass.

As shown in FIG. 11, the line illuminating device 110 according to the sixth embodiment is composed of two illuminating units 110L and 110R. Each illuminating unit 110L and 110R consists of a light guide 103, a light guide casing 104, and a light-emitting source base plate 111 to which a light-emitting source 112 such as a light-emitting diode is attached. Reference numeral 111*a* is a group of terminals for supplying the light-emitting source 112 with electric power.

Each light guide 103 is made of glass or transparent resin. As shown in FIG. 10, the light guide 103 is housed in the light guide casing 104 of white color so that the emission plane 103*a* is exposed. The light guide 103 has a cross-sectional shape substantially ¼ oval in the direction at right angles to the longitudinal direction. The light guide 103 is provided with an emission plane 103*a* parallel to a minor axis of the oval, a surface 103*b* parallel to a major axis of the oval, and a reflecting curved surface 103*c*. The light guide 103 is further provided, on the surface 103*b* parallel to the major axis of the oval, with light scattering patterns P which are formed by printing the white coating material and the like.

Each lighting unit 110L and 110R is symmetrically arranged around the lens array 105 relative to a plane where the emission plane 103*a* of each light guide 103 is at right angles to the document-reading surface. With this arrangement, each emission light from the emission plane 103*a* of each light guide 103 irradiates the same area of the document (reading surface). More specifically, the light emitted from the emission plane 103*a* of the left light guide 103 illuminates the document-reading surface from the left, while the light emitted from the emission plane 103*a* of the right light guide 103 illuminates the document-reading surface from the right. The reflected light on the document-reading surface is detected by the line image sensor 106 through the lens array 105.

In the line illuminating device 110 according to the sixth embodiment, as shown in FIG. 12(*a*), each illuminating unit 110L and 110R is arranged to alternately locate each light scattering pattern LPa~LPf of one light guide 103 and each light scattering pattern Rpa~RPf of the other light guide 103.

FIG. 12(*c*) qualitatively shows the light intensity distribution at a surface position (the position of the document-reading surface in a condition where the document is not elevated) of the cover glass 108 corresponding to a position at a distance L0 from each emission plane 103a of each illuminating unit 110L and 110R, i.e. the light intensity distribution of the document-reading surface at a position where the document closely contacts the cover glass 108, in which reference letters CL shows the light intensity distribution of one illuminating unit 110L, reference letters CR shows the light intensity distribution of the other illuminating unit 110R, and reference letters C (L+R) show the compounded light intensity distribution. FIG. 12(b) qualitatively shows the light intensity distribution of the document-reading surface in a condition where the document is elevated from the surface of the cover glass 108 by a distance ΔL0, in which reference letters DL show the light intensity distribution by one illuminating unit 110L, reference letters DR show the light intensity distribution by the other illuminating unit 110R, and reference letters D (L+R) show the compounded light intensity distribution.

Figure 13:
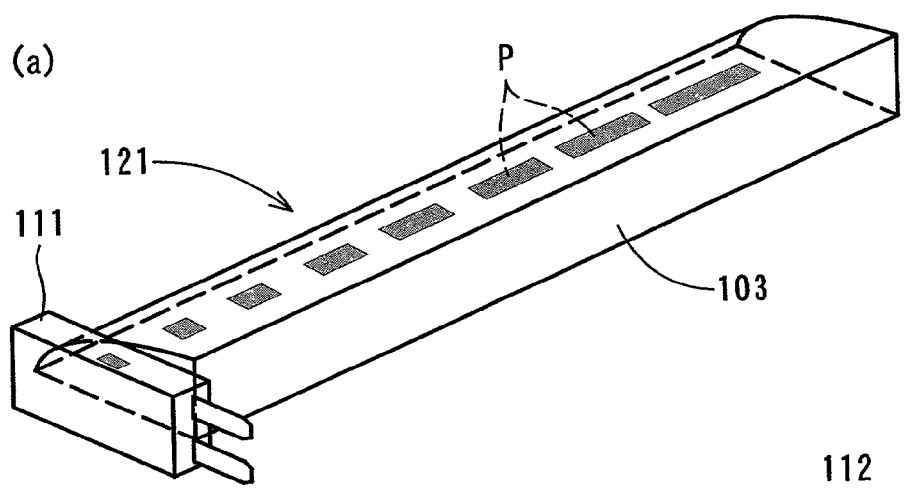
FIGS. 13(a), 13(b) and 13(c) are perspective views of a line illuminating device according to a seventh embodiment of the present invention.
Figure 13:
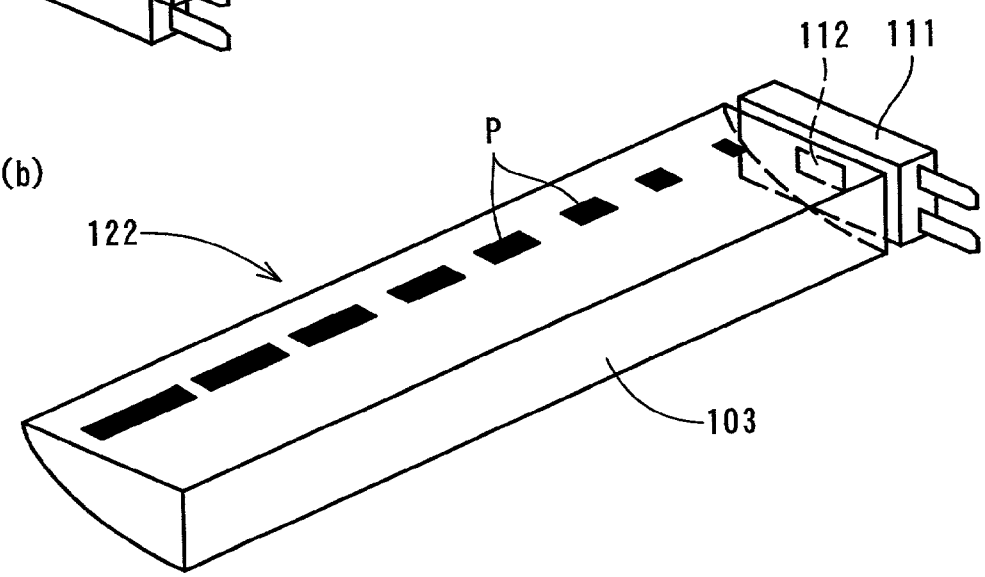
Figure 13:
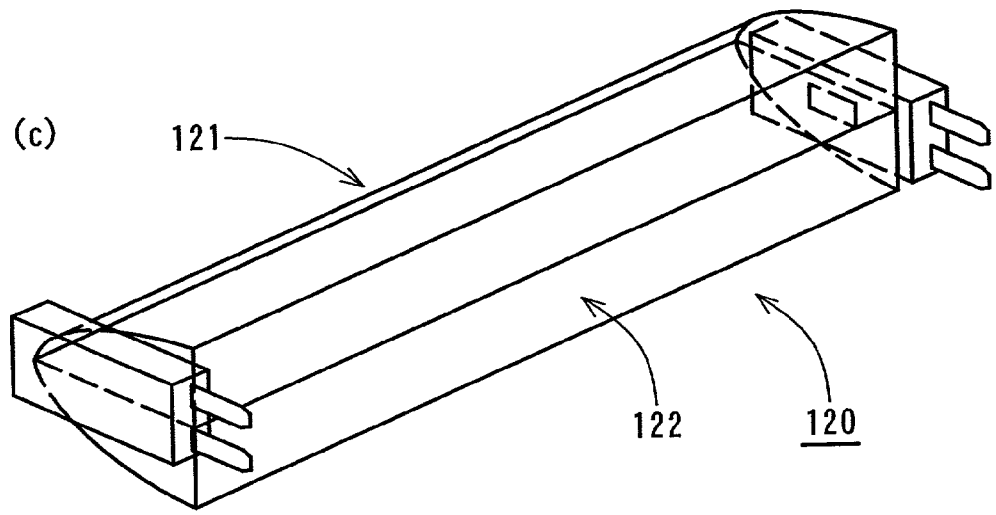

As shown in FIG. 12(a), each light-scattering pattern LPa~LPf of one light guide 103 and each light-scattering pattern RPa~RPf of the other light guide 103 are alternately arranged. Accordingly, as shown in FIG. 12(c), since the compounded light intensity distribution C (L+R) of the light intensity distribution CL and the light intensity distribution CR offsets mutual peaks and dips, the light intensity is uniform. With this arrangement, the variation width of the quantity of light in the main-scanning direction can be reduced to less than half of the variation width when only one illuminating unit as shown in FIG. 13 is used.

Further, a difference between the variation width of the compounded light intensity distribution D (L+R) when the document surface is elevated and the variation width of the compounded light intensity distribution C (L+R) when the document closely contacts the surface of the cover glass 108 is also small. Accordingly, unevenness in the reading image is not readily produced even when the document surface is elevated from the cover glass 108.

As shown in FIGS. 10 and 11, as illuminating light is applied to the document-reading surface from two directions, it is possible to eliminate the shading caused when the light is applied to a fold or laminating difference in level of the paper surface from one direction.

Also, as shown in FIG. 11, the positions of the light-emitting sources 112 are oppositely arranged in such a condition that the light emitted from each of the illuminating units 110L and 110R is arranged to irradiate the same area of the document-reading surface. It is therefore possible to improve the uniformity of the light intensity distribution in the main-scanning direction (i.e. Y direction).

FIG. 13 is a perspective view of an other line illuminating device according to a seventh embodiment of the present invention. This line illuminating device 120 is formed by combining one illuminating unit 121 as shown in FIG. 13(a) with the other illuminating unit 122 as shown in FIG. 13(b) by adhesion or close-contact as shown in FIG. 13(c). It is to be noted that the two illuminating units 121 and 122 may be integrated using a light guide casing (not shown). Arrangement of light scattering patterns P is alternately made under conditions whereby the illuminating units 121 and 122 are integrated.

Figure 27:
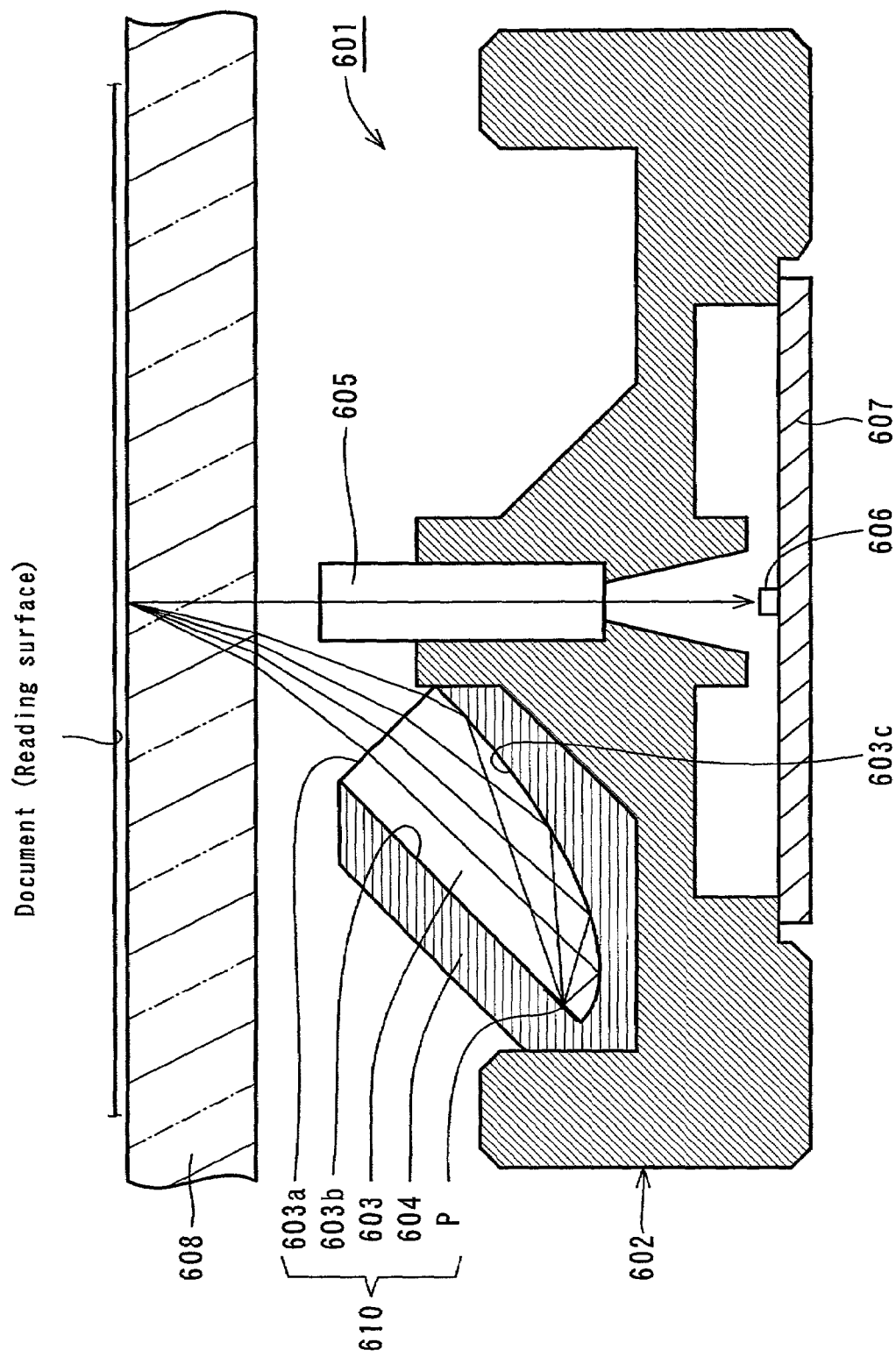
FIG. 27 is a cross-sectional view of an other conventional contact-type image sensor.
Figure 28:
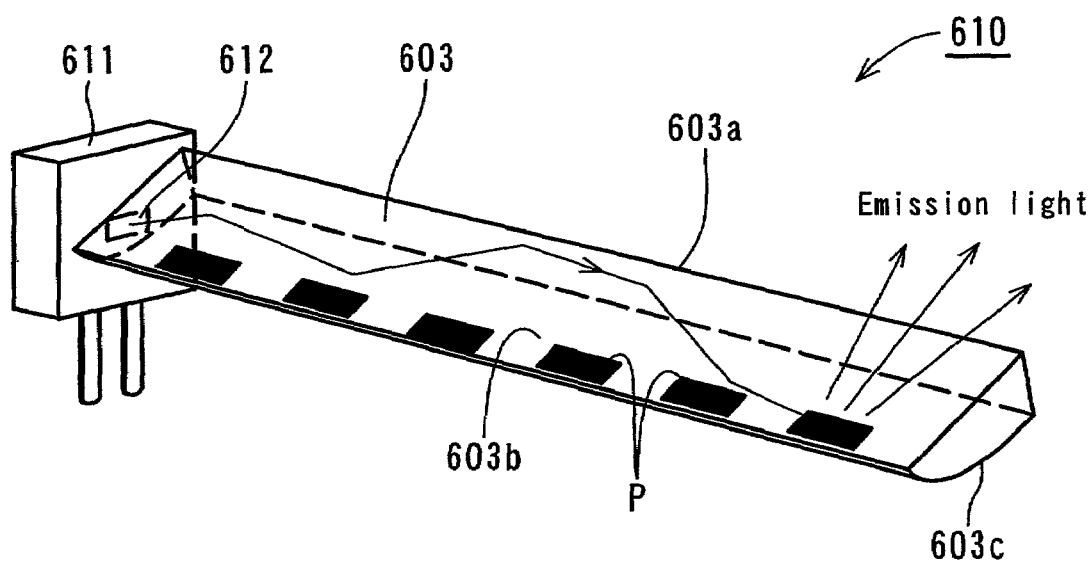
FIG. 28 is a perspective view (showing the condition without a light guide casing) of the conventional line illuminating device which is used in the contact-type image sensor as shown in FIG. 27.
Figure 29:
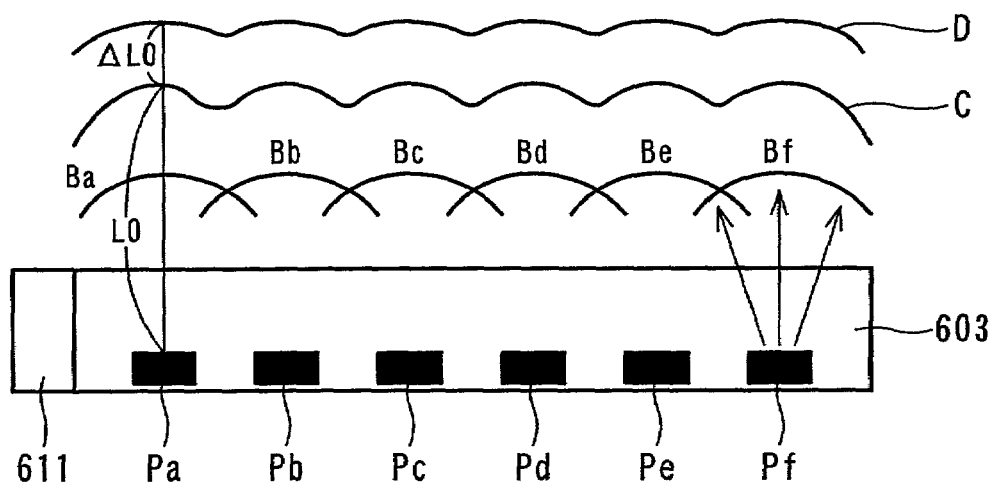
FIG. 29 is a view showing the intensity distribution of a light emitted from the line illuminating device as shown in FIG. 28.
Figure 30:
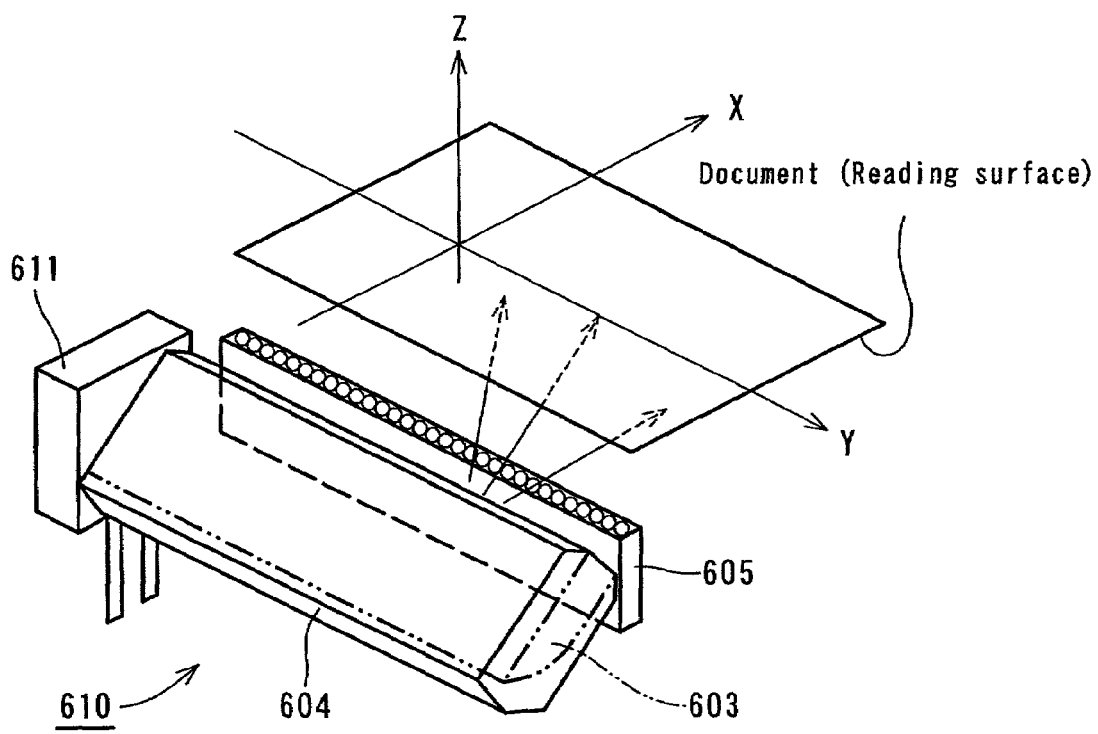
FIG. 30 is a perspective view showing the positional relationship between the line illuminating device and an image-formation lens in the contact-type image sensor as shown in FIG. 27.
Figure 31:
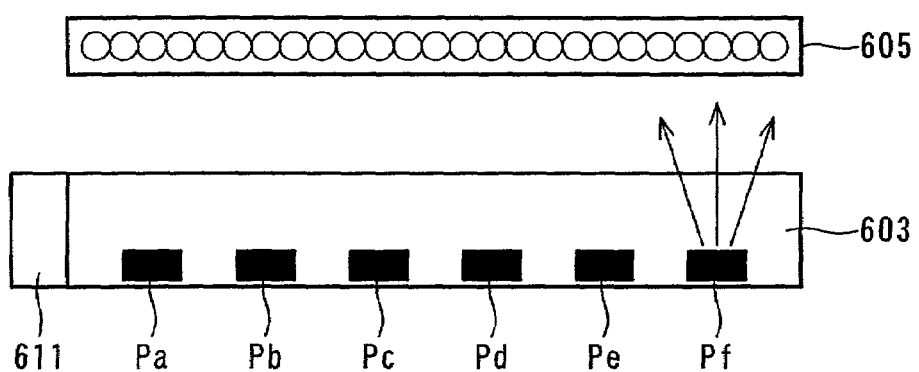
FIG. 31 is a plan view showing the positional relationship between the line illuminating device and the image-formation lens in the contact-type image sensor as shown in FIG. 27.

By positioning the two illuminating units 121 and 122 in close contact or bringing them close to one another, the line illuminating device 120 can be made compact. As a result, a contact-type image sensor (a document-reading device) can be made compact. In this case, the line illuminating device 120 is arranged on the right or left side of the lens array in the same manner as for the conventional contact-type image sensor shown in FIG. 27.

Figure 14:
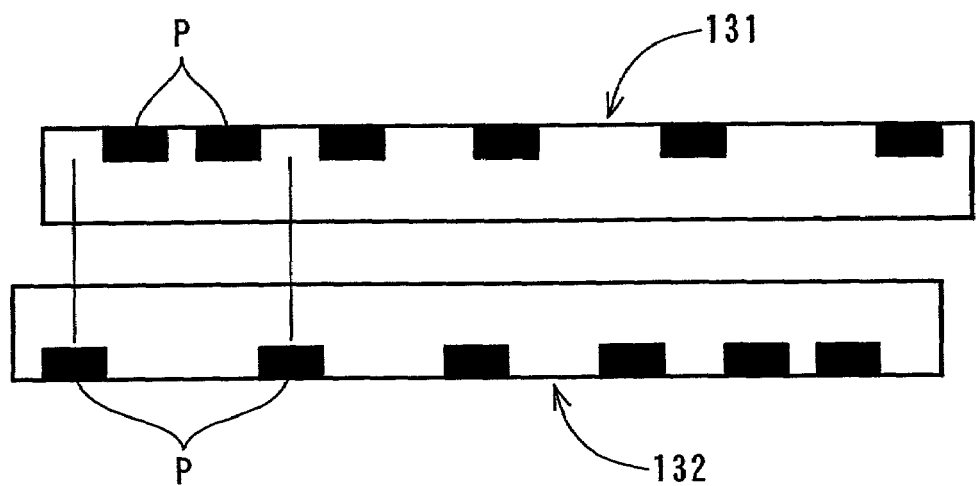
FIG. 14 is a view showing another arrangement example of the light-scattering patterns.

FIG. 14 is a view showing another example of the arrangement of light scattering patterns. When the interval between the center lines of the light-scattering patterns P is not constant, the light-scattering patterns are alternately arranged at a position where variation of the light intensity distribution waveform is large. Reference numeral 131 is one light guide and reference numeral 132 is the other light guide.

Figure 15:
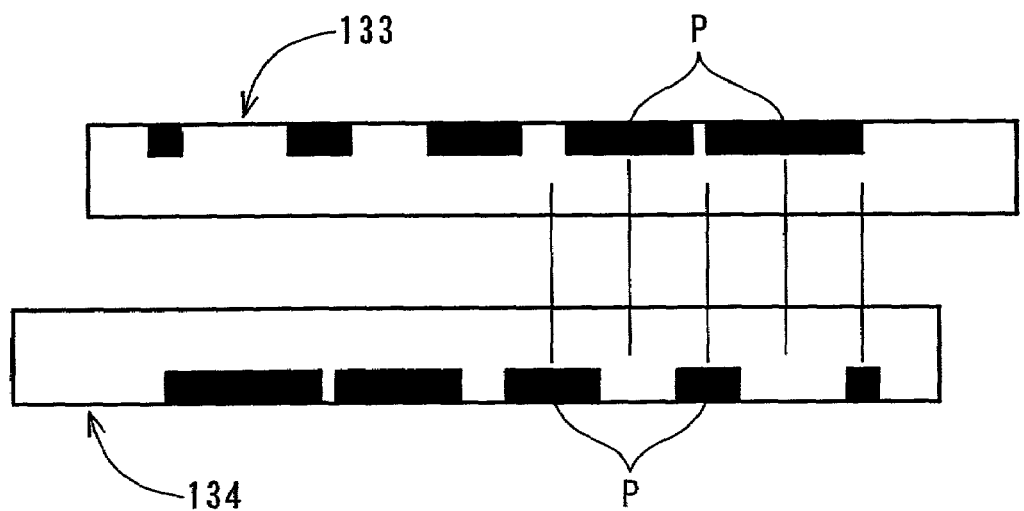
FIG. 15 is a view showing yet another arrangement example of the light-scattering patterns.

FIG. 15 is a view showing another example of the arrangement of light-scattering patterns. When the interval between the center lines of the light-scattering patterns P is constant, but the widths of the light-scattering patterns P are not constant, the center lines are alternately arranged. Reference numeral 133 is one light guide and reference numeral 134 is the other light guide.

In this embodiment, the light guide 103 is shown as one concrete example having a cross-sectional shape substantially ¼ oval in the longitudinal direction, but the light guide 103 may be rectangular or polygonal cross-section.

As described above, the line illuminating device according to the present invention uses two light guides which allow the light to scatter at the light scattering patterns intermittently formed over the longitudinal direction and to emit this light from the emission plane. The light guide is also arranged so that the light-scattering patterns are alternately disposed between the light guides. Thus, in the compounded light intensity distribution, the peak of the light intensity distribution by the light-scattering patterns of one light guide and the dip of the light intensity distribution from the light-scattering patterns of the other light guide are offset. Accordingly, unevenness (i.e. amount of variation) of the light intensity becomes small and high uniformity is realized.

Since each light guide is symmetrically arranged relative to a plane where the emission plane meets the document-reading surface at right angles, the light can be applied to the document-reading surface from two directions. With this arrangement, it is possible to eliminate the shading caused when the light is applied to a fold, or laminating difference in level or the like of the paper surface from one direction. Thus, the document image can be read satisfactorily even when there is a fold, laminating difference in level or the like on the document.

Further, in a condition in which each light guide is arranged so that the light emitted from each emission plane irradiates the same area of the document-reading surface, since one light guide is provided with a light-emitting source at one end in its longitudinal direction, while the other light guide is provided with a light-emitting source at the other end in its longitudinal direction, uniformity of light intensity distribution can be improved.

Next, a new problem produced when two line illuminating units are oppositely arranged so that both illuminating lights irradiate the same area of the document-reading surface will now be described together with a solution to the problem.

Figure 16:
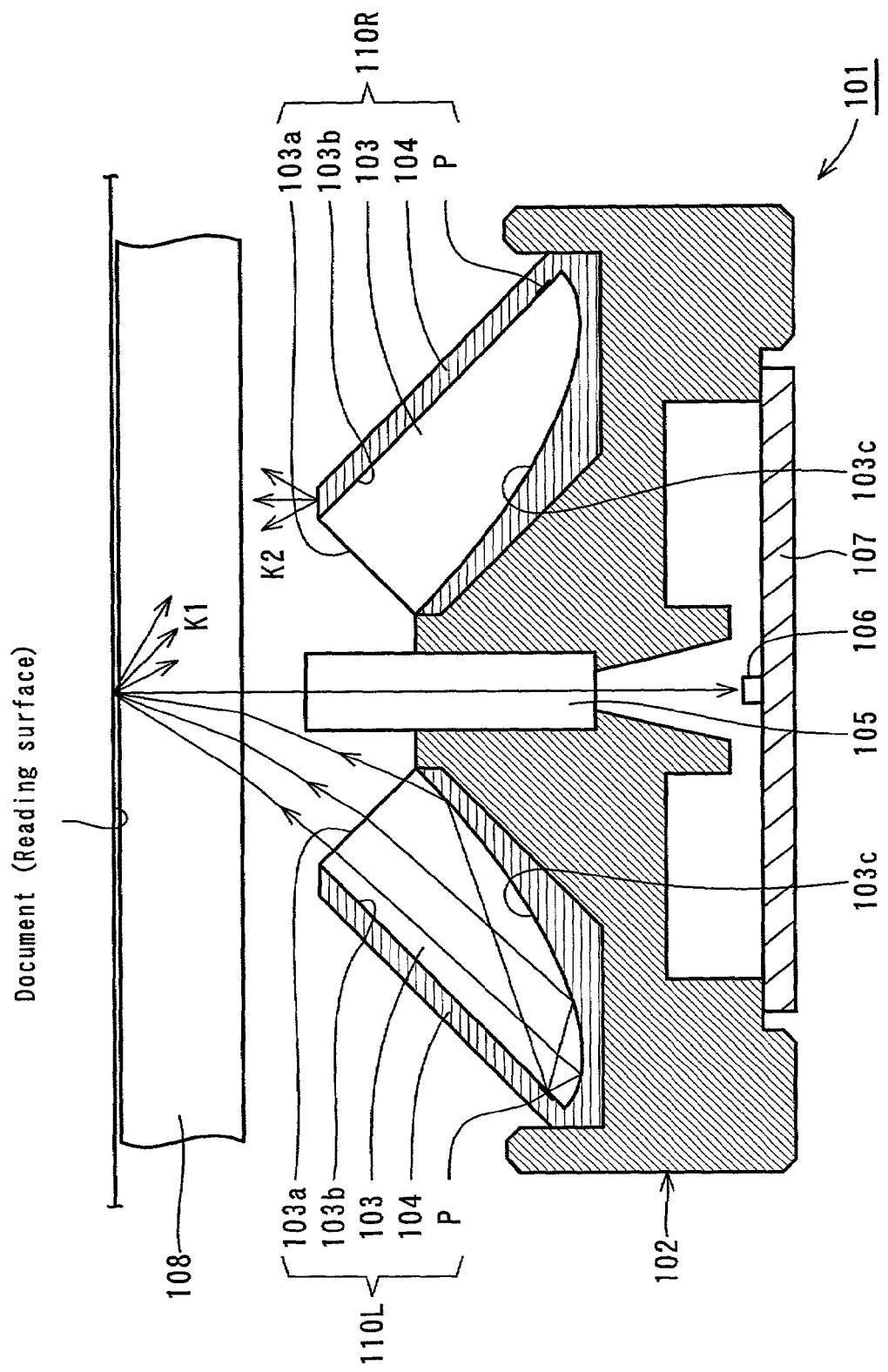
FIG. 16 is a view showing a problem of a line illuminating device in which two line illuminating units are opposedly arranged, wherein only one line illuminating unit is lighted.

FIG. 16 is a view showing the problem of the line illuminating device in which two line illuminating units are oppositely arranged, and the condition in which only one illuminating unit 110L is lighted.

When a document is on the glass surface of a cover glass 108, newly scattered and reflected light K1 is generated from the document surface to which the illuminating light of the line illuminating unit 110L has been applied, and this scattered and reflected light K1 from the document surface illuminates the upper surface of the other line illuminating unit 110R. Since the light guide casing 104 is made of a white material with a high scattering and reflection factor, this upper surface of the light guide casing 104 becomes a new light source K2 for illuminating the document surface. Thus, the light intensity on the optical axis of the rod lens 105 varies depending on whether or not there is any document.

Figure 17:
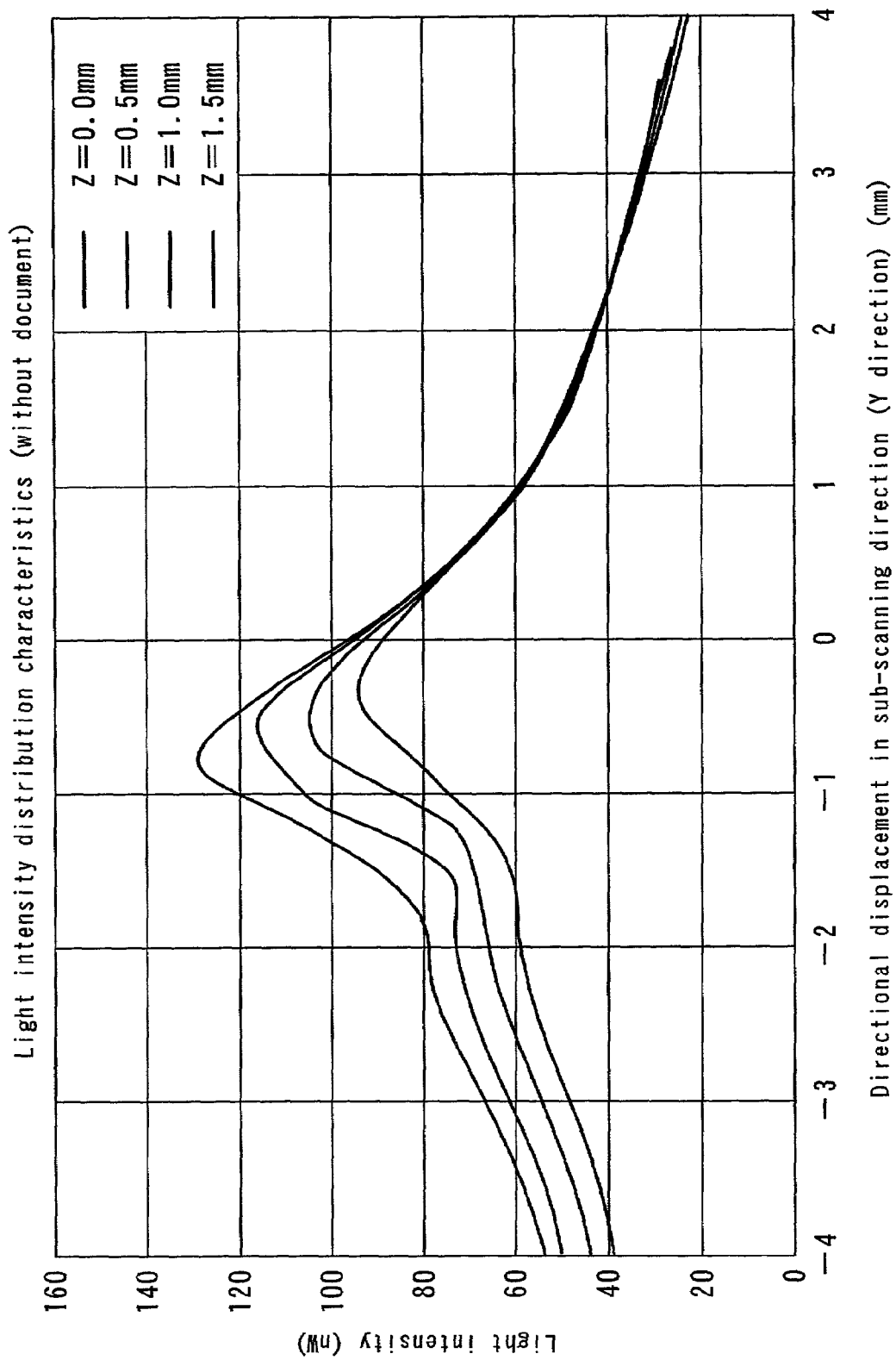
FIG. 17 is a graph of light intensity characteristics in a condition without a document in the line illuminating device as shown in FIG. 16.
Figure 18:
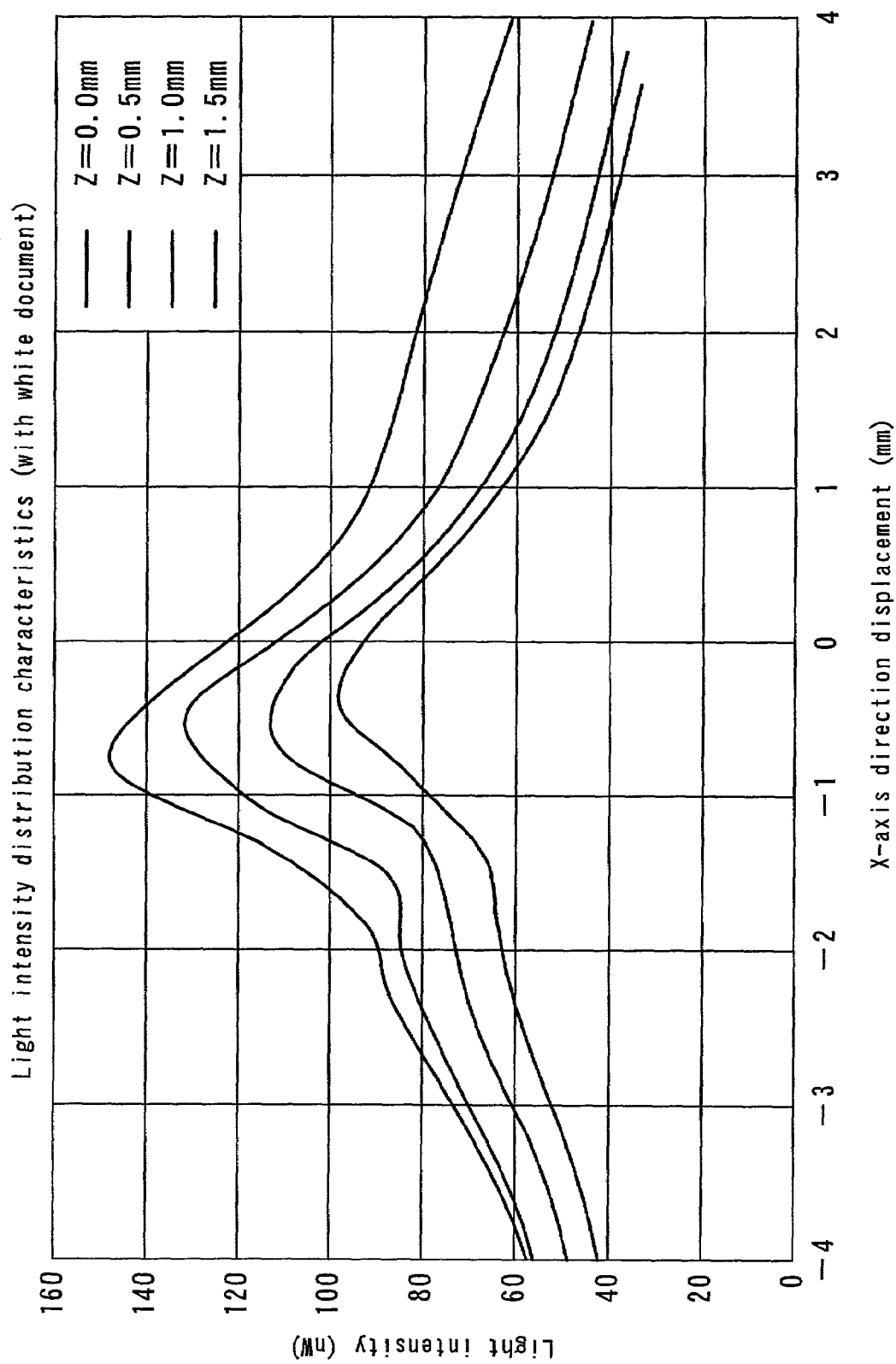
FIG. 18 is a graph of light intensity characteristics in a condition with a white document in the line illuminating device as shown in FIG. 16.

FIG. 17 is a graph of light intensity characteristics under the conditions where there is no document, and FIG. 18 is a graph of light intensity characteristics with a white document. In these graphs, the vertical axis shows the light intensity and the horizontal axis shows the sub-scanning direction displacement. The origin 0 of the sub-scanning direction displacement is an optical axis position of the rod lens 105. A side of one line illuminating unit 110L is shown by a minus value, while a side of the other line illuminating unit 110R is shown by a plus value. A round mark indicates the light intensity characteristics on the glass surface (Z=0.0 mm) of the cover glass 108 and a square mark indicates the light intensity characteristics at a position 0.5 mm up (Z=0.5 mm) from the glass surface. A triangular mark indicates the light intensity characteristics at a position 1.0 mm up (Z=1.0 mm) from the glass surface and an x mark indicates the light intensity characteristics at a position 1.5 mm up (Z=1.5 mm) from the glass surface. Each light intensity characteristic as shown in FIG. 18 shows a condition in which a white document contacts the glass surface of the cover glass 108 (Z=0.00 mm) and conditions under which the white document is elevated from the glass surface by 0.5 mm, 1.0 mm, and 1.5 mm respectively. It is clear from these graphs that the light intensity varies, depending on whether or not there is a white document present.

Figure 19:
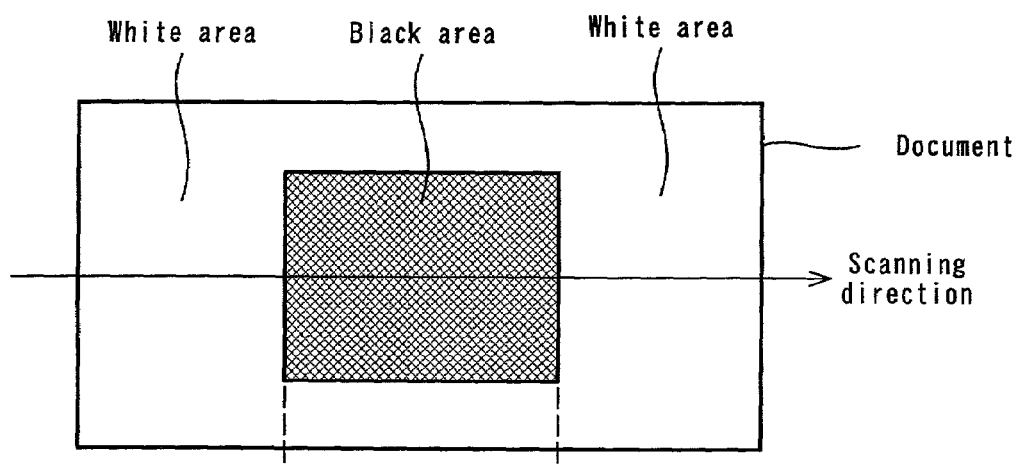
FIGS. 19(a) and 19(b) are views showing an output signal when a document with a black rectangular area is read in the line illuminating device as shown in FIG. 16.
Figure 19:
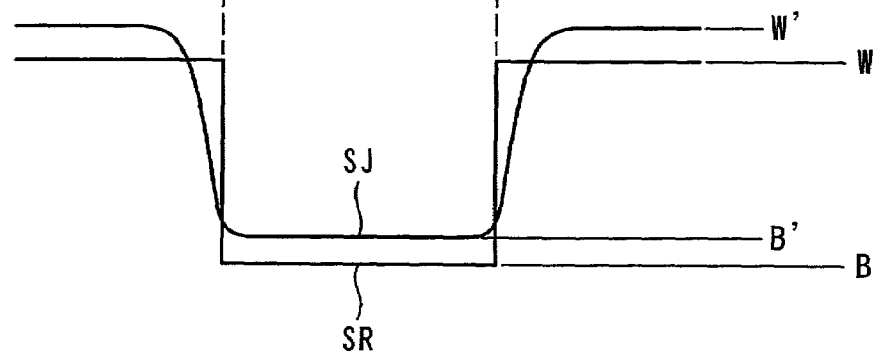

FIG. 19 is a view showing an output signal when a document with a black rectangular area is read. FIG. 19(a) shows the document to be read and FIG. 19(b) shows the output signal. When the document with the black rectangular area is scanned in the direction shown by an arrow, an ideal output signal is shown by reference letters SR in which a change from a white level W to a black level B and a change from the black level B to the white level W are steep. On the contrary, as shown in FIG. 16, the reading output signal of the document under conditions in which light K1 scattered and reflected at the white portion of the document is reflected onto the upper surface of the light guide casing 104 and this reflected light K2 at the light guide casing 104 is irradiated on the document surface is shown by SJ, in which the change from the white level W' to the black level B' and the change from the black level B' to the white level W' are gentle. As a result, a reading image produces a blur in the black rectangular area. This blur in the reading image is produced both in the main-scanning direction and in the sub-scanning direction. Further, since the upper surface of the light guide casing 104 becomes a new light source, the light intensity on the document surface increases. Accordingly, the white level W' and the black level B' of the output signal SJ are higher than the white level W and the black level B of the ideal output signal SR.

As described above, in the contact-type image sensor (the image reading device) 101 provided with line illuminating device in which two line illuminating units 110L and 110R are opposedly arranged, the light scattered and reflected at the document is scattered and reflected again at the light guide casing 104 and irradiates the document surface. Accordingly, the quantity of light which is scattered and reflected at the document surface changes according to the size of the document and the positional relationship between the white area and the black area of the document surface. In response to the change of quantity of light, the light is scattered and reflected again at the light guide casing 104 and the quantity of light irradiating the document surface changes so that the light intensity distribution of the illuminating light in the document-reading area becomes uneven. It is therefore not possible to correctly read brightness of the document and the read image becomes unclear.

The present invention is made to solve these problems and to provide a line illuminating device which can prevent the light scattered and reflected at the document surface from again being reflected at the light guide casing to again irradiate the document surface and which can read the document clearly.

To solve the above-mentioned problems, the line illuminating device according to the present invention is characterized in that the light guide casing is provided, on its outside, with a coating film for controlling scattering and reflection of the light.

Since the light guide casing is provided, on its outside, with the coating film for controlling scattering and reflection of light, it is possible to prevent the light scattered and reflected from the document surface from being scattered and reflected again at the light guide casing. With this construction, the light scattered and reflected at the light guide casing will no longer irradiate the document surface. Accordingly, original light intensity distribution of the illuminating light will no longer disturbed by the scattered and reflected light from the light guide casing and as a result, the image can be clearly read.

Further, the line illuminating device according to the present invention is characterized in that the light guide casing is covered by a member for controlling scattering and reflection of the light.

By covering the light guide casing with the member for controlling scattering and reflection of the light, it is possible to prevent the scattered and reflected light from the document surface from again being scattered and reflected at the light guide casing. As a result, the original intensity distribution of illuminating light will no longer disturbed by the scattered and reflected light from the light guide casing. As a result, the image can be clearly read.

Figure 20:
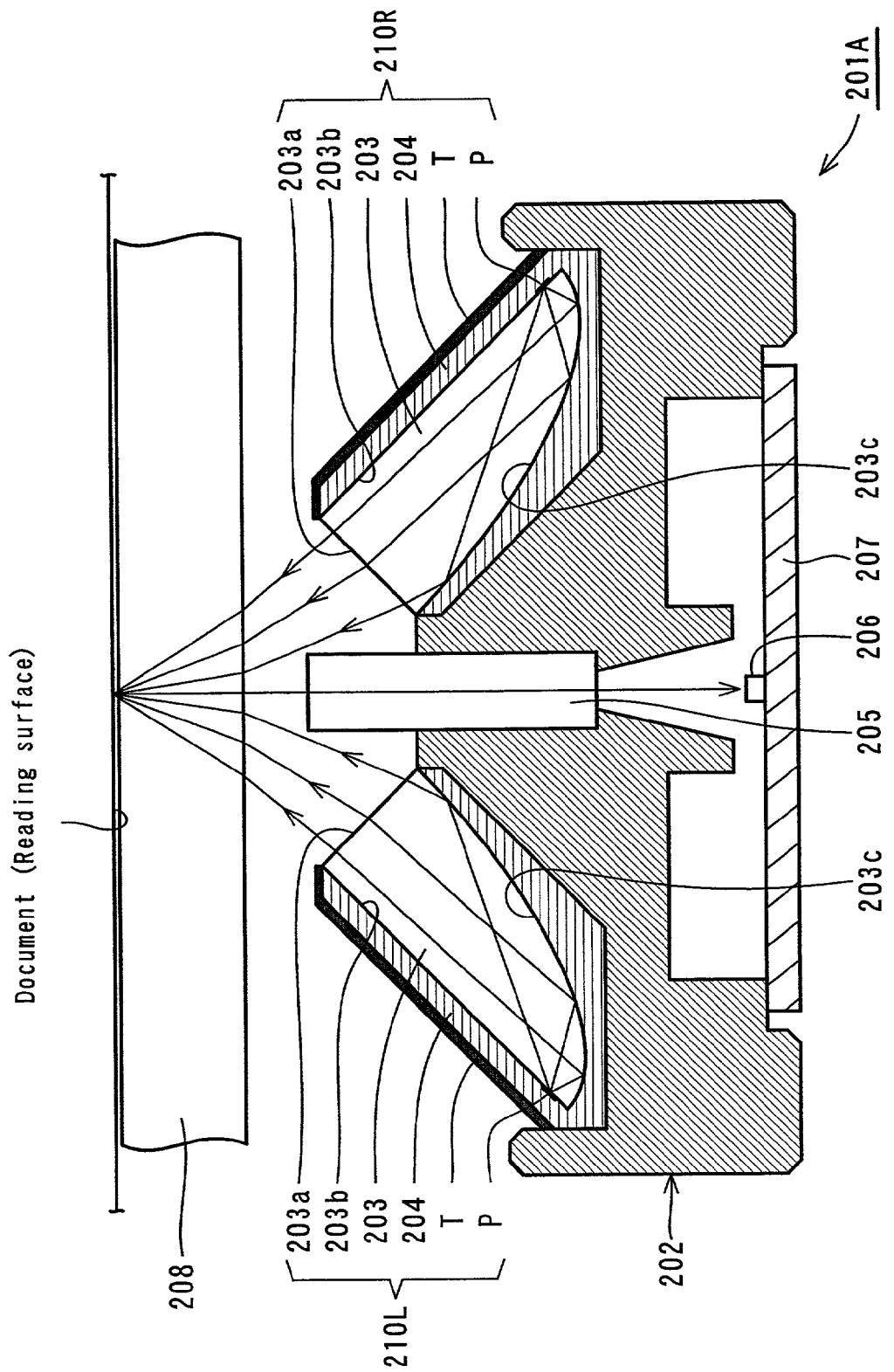
FIG. 20 is a cross-sectional view of a contact-type image sensor to which a line illuminating device according to an eighth embodiment of the present invention is applied.

FIG. 20 is a cross-sectional view of a contact-type image sensor to which a line illuminating device according to an eighth embodiment of the present invention is applied.

The contact-type image sensor (an image reading device) 201A as shown in FIG. 20 comprises a box 202, two line illuminating units 210L and 210R incorporated in the box 202, a lens array 205 for serving as an equimultiple image-formation lens arranged in the box, and a sensor base plate 207 provided with a line image sensor (light source conversion element) attached to the lower section of the box 202. A line illuminating device is composed of the two line illuminating units 210L and 210R which are opposedly arranged. The contact-type image sensor (the image reading device) 201A is provided to allow the illuminating light emitted from an emission plane 203a of each light guide 203 to be incident on a document-reading surface through a cover glass 208 and to allow the line image sensor (the light source conversion element) 206 to detect the reflected light through the lens array 205 to read the document.

The line illuminating units 210L and 210R differ from the line illuminating units 110L and 110R according to the sixth embodiment as shown in FIG. 10 in that a light guide casing 204 is provided, on its outside, with a coating film T for controlling scattering and reflection of light. The coating film T is formed by coating the outside of the light guide casing 204 in a black mat color. Since the scattered and reflected light from the document surface is absorbed by the coating film T, it is possible to prevent the light guide casing 204 from becoming a new light source. With this arrangement, the original intensity distribution of illuminating light will not be disturbed by the scattered and reflected light from the light guide casing 204 and as a result, the image can be clearly read.

Figure 21:
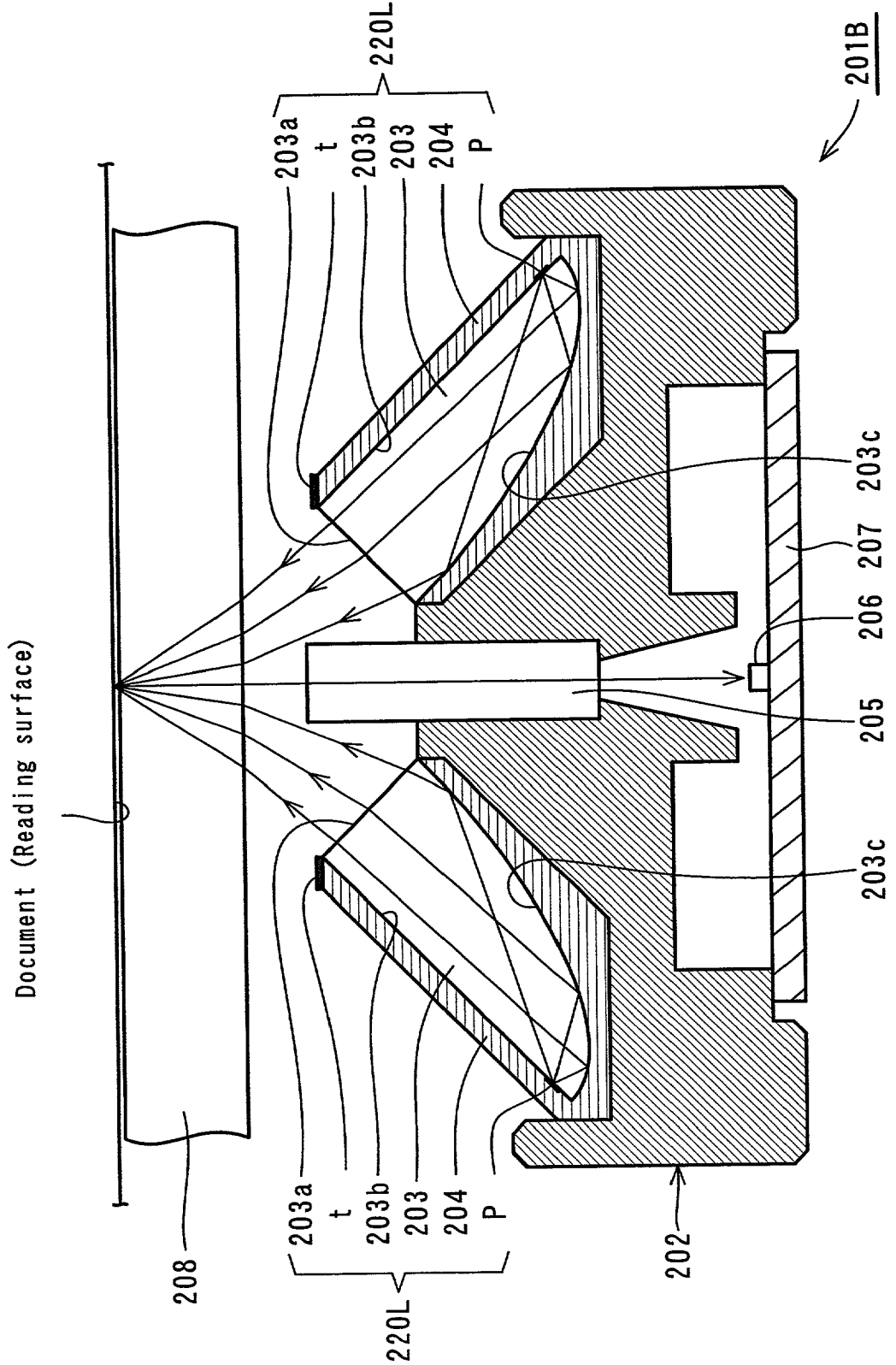
FIG. 21 is a cross-sectional view of a contact-type image sensor to which a line illuminating device according to a ninth embodiment of the present invention is applied.

FIG. 21 is a cross-sectional view of a contact-type image sensor to which a line illuminating device according to a ninth embodiment of the present invention is applied. Each line illuminating unit 220L and 220R as shown in FIG. 21 is provided in such a manner that a coating film t is formed only on the upper end surface of a light guide casing 204. By coating only the upper end surface substantially parallel to a manuscript-reading surface in a black mat color, it is possible to effectively prevent the light guide casing 204 from becoming a new light source. Thus, the original intensity distribution of the illuminating light will not be disturbed by the scattered and reflected light from the light guide casing 204 and as a result, an image can be clearly read.

Figure 22:
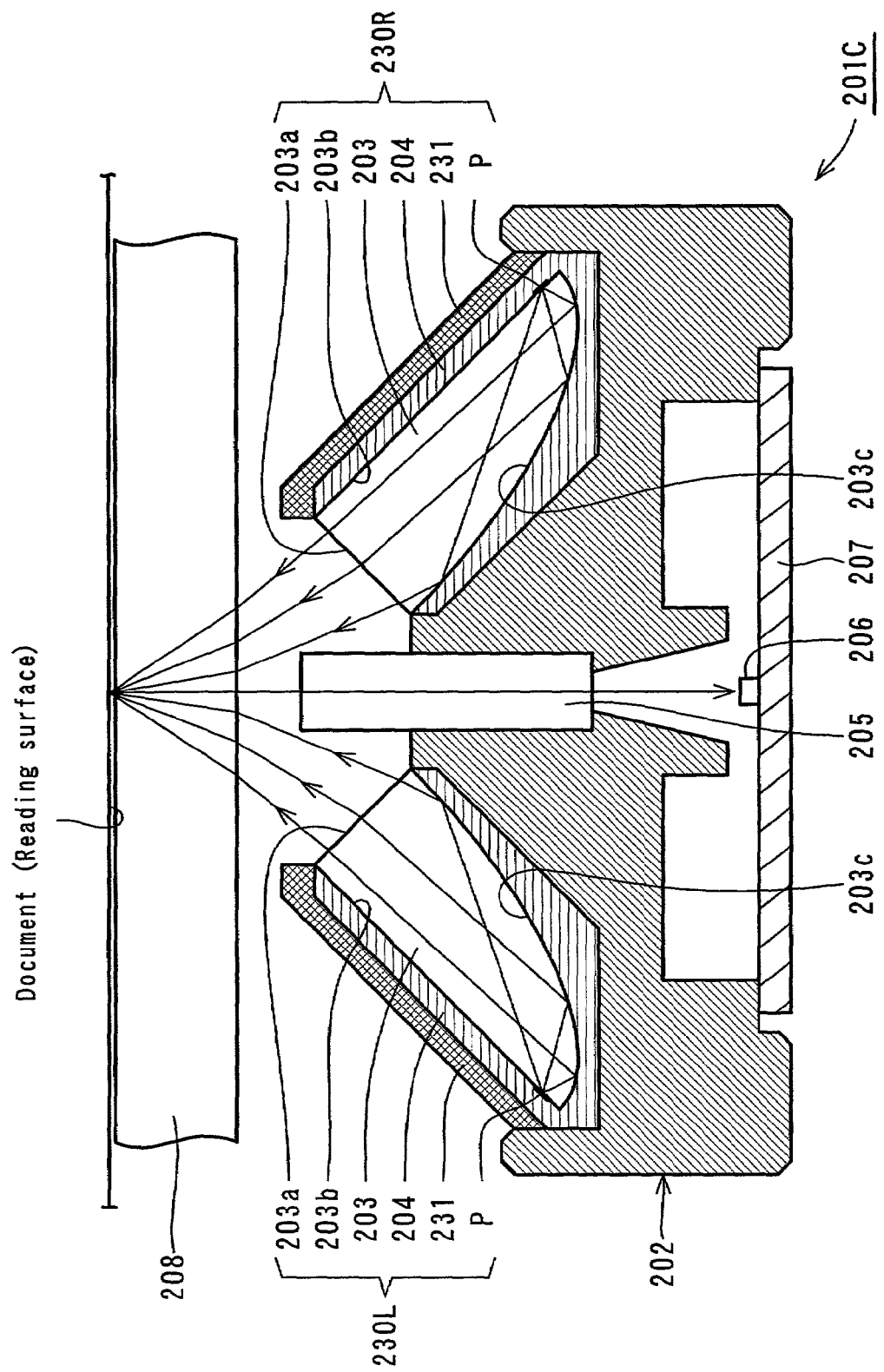
FIG. 22 is a cross-sectional view of a contact-type image sensor to which a line illuminating device according to a tenth embodiment of the present invention is applied.

FIG. 22 is a cross-sectional view of a contact-type image sensor to which a line illuminating device according to a tenth embodiment of the present invention is applied. Each line illuminating unit 230L and 230R as shown in FIG. 22 is provided in such a manner that the outside of a light guide casing 204 is covered by a black cover 231.

Figure 23:
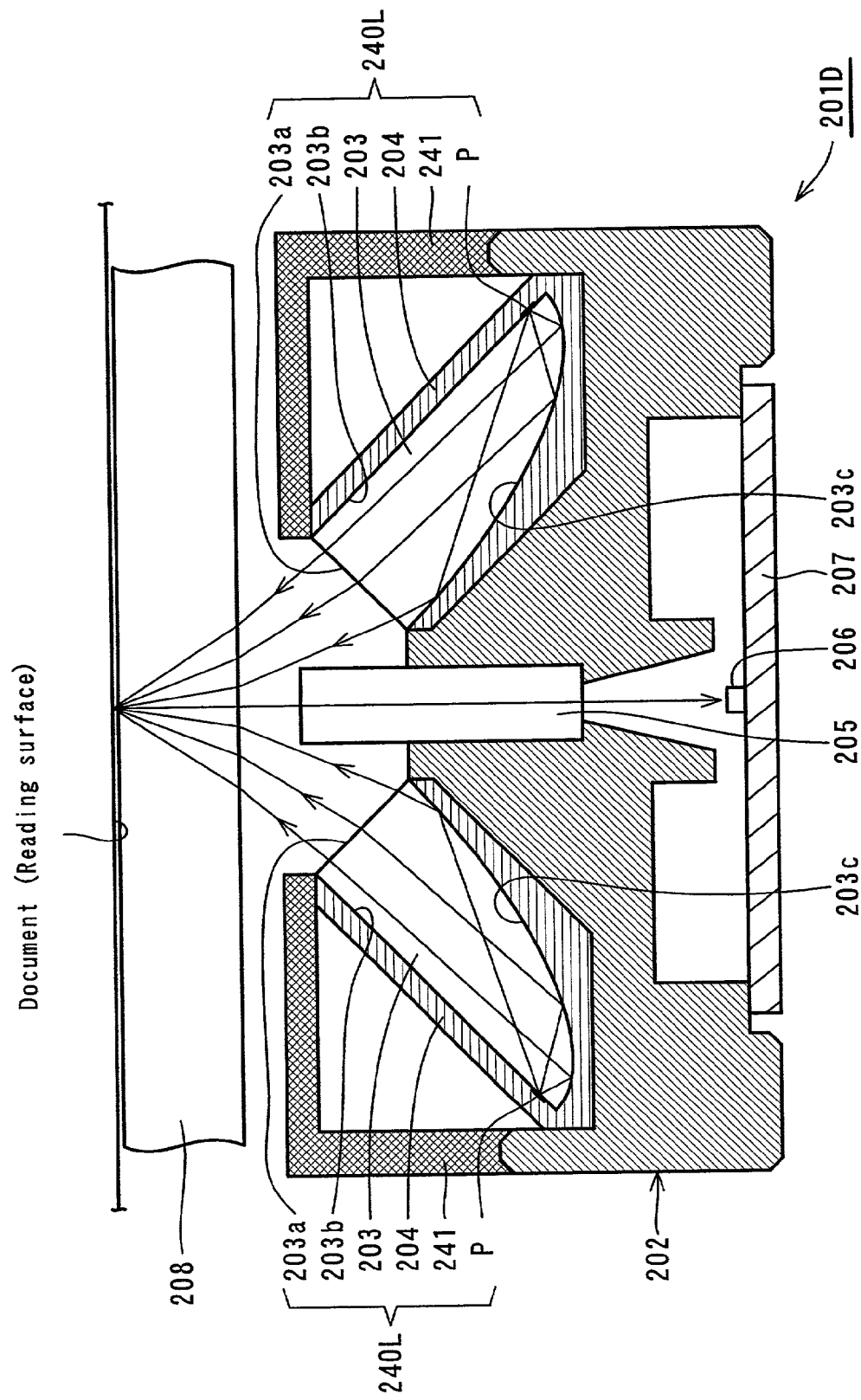
FIG. 23 is a cross-sectional view of a contact-type image sensor to which a line illuminating device according to an eleventh embodiment of the present invention is applied.
Figure 24:
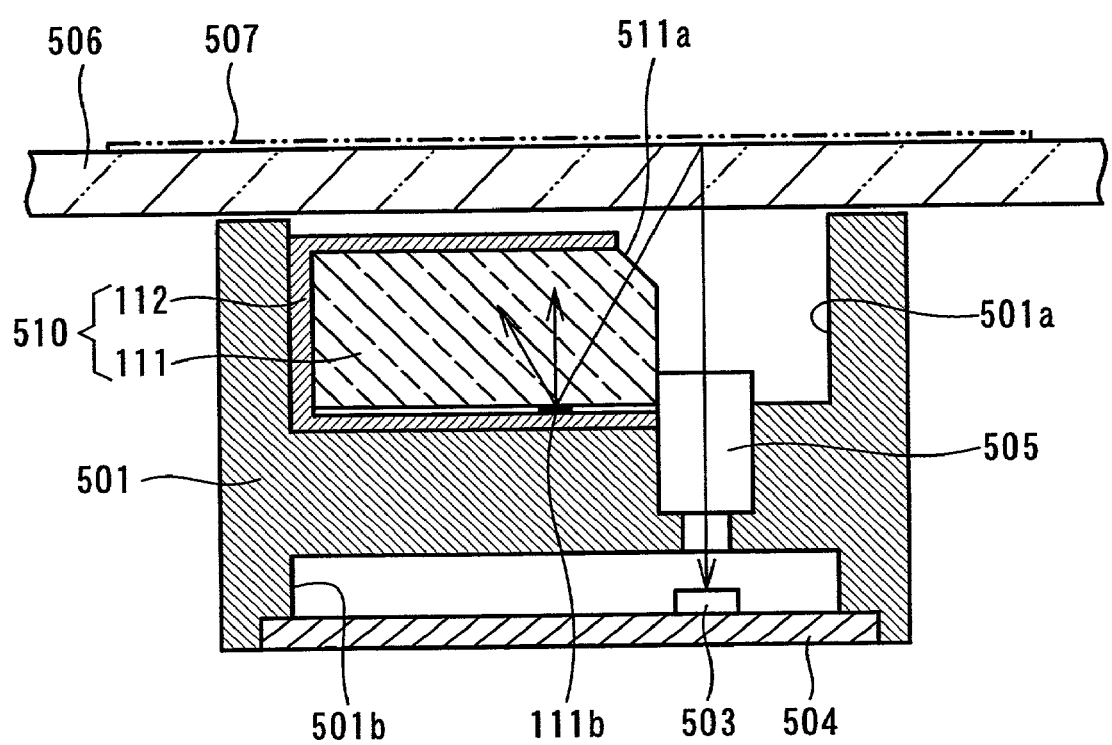
FIG. 24 is a cross-sectional view of a document-reading device incorporating a conventional line illuminating device.

FIG. 23 is a cross-sectional view of a contact-type image sensor to which a line illuminating device according to an eleventh embodiment of the present invention is applied. Each line illuminating unit 240L and 240R as shown in FIG. 23 is provided in such a manner that the upper section of a light guide casing 204 is covered by a black cover 241 with, for example, an L-shaped cross-section.

As shown in FIGS. 22 and 23, if the light guide casing 204 is covered by a member such as the black covers 231 and 241 for controlling scattering and reflection of light, it is possible to effectively prevent the light guide casing 204 from becoming a new light source. In this manner, the original intensity distribution of the illuminating light will not be disturbed by the scattered and reflected light from the light guide casing 204 and as a result, an image can be clearly read.

As described above, the line illuminating device according to the present invention is provided so that the light guide casing is provided, on its outside, with a coating film for controlling scattering and reflection of light or the light guide casing is covered by a member for controlling scattering and reflection of the light. It is therefore possible to prevent the scattered and reflected light from the document surface from again being scattered and reflected at the light guide casing. Therefore, the light scattered and reflected at the light guide casing will no longer irradiate the document surface. Accordingly, the original intensity distribution of the illuminating light will no longer be disturbed and the image can be clearly read.

What is claimed is:

1. A line illuminating device having two light guides for guiding light from a light source incident from an end surface in the longitudinal direction and for emitting the light from an emission plane formed along the longitudinal direction, characterized in that these light guides are arranged in such a manner that the light emitted from the emission plane of each light guide irradiates the same area of a document-reading plane, and one light guide is provided, at one end of its longitudinal direction, with a first light-emitting source, while the other light guide is provided, at the other end of its longitudinal direction, with a second light-emitting source.

2. The line illuminating device according to claim 1, wherein each light guide is symmetrically arranged relative to a plane where the emission plane is at right angles to the document-reading plane.

3. The line illuminating device according to claim 1, wherein each light guide is housed in a casing in such a manner that at least the emission plane is exposed.

4. The line illuminating device according to claim 1, wherein the light guide is formed with light-scattering patterns for scattering illuminating light at a predetermined plane except for an incident plane and the emission plane of the light guide.

5. A line illuminating device having a pair of light guides arranged to guide light from a light source incident from an end surface in the longitudinal direction and to scatter the incident light at light scattering patterns disposed, printed or laminated upon the pair of light guides and formed intermittently over the longitudinal direction so as to irradiate the same area of a document-reading plane, characterized in that these light guides are alternately arranged so that the light-scattering patterns formed on one light guide compensate for the shortage of light-scattering patterns formed on the other light guide.

6. The line illuminating device according to claim 5, wherein each light guide is symmetrically arranged relative to a plane where the emission plane is at right angles to the document-reading plane.

7. The line illuminating device according to claim 5, wherein each light guide is placed one upon another, and the emission plane is arranged on one side relative to a plane where the emission plane is at right angles to the document-reading surface.

8. The line illuminating device according to claim 5, wherein, under conditions where the pair of light guides are arranged in such a manner that the light emitted from each emission plane irradiates the same area of the document-reading plane, one light guide is provided with a light-emitting source at one end of the longitudinal direction, while the other light guide is provided with a light-emitting source at the other end of the longitudinal direction.

9. A line illuminating device having a light guide for guiding light from a light source incident from an end surface in the longitudinal direction and for scattering the light at light-scattering patterns formed along the longitudinal direction to emit this light from an emission plane, this line illuminating device being provided with two line illuminating units for housing the light guide in a casing, characterized in that each line illuminating unit is arranged in such a manner that the light emitted from the emission plane of each light guide irradiates the same area of the document-reading plane, and the light guide casing has at least an outside section treated to control scattering and reflection of the light.

10. A line illuminating device having a light guide for conducting light from a light source incident from an end surface in the longitudinal direction and for scattering the light at light-scattering patterns formed along the longitudinal direction to emit this light from an emission plane, this line illuminating device being provided with two line illuminating units for housing the light guide in a casing, characterized in that each line illuminating unit is arranged in such a manner that the light emitted from the emission plane of each light guide irradiates the same area of a document-reading plane, and the light guide casing has at least an outside section covered by a member for controlling scattering and reflection of the light.

* * * * *